(12) United States Patent
Kwak et al.

(10) Patent No.: US 11,122,582 B2
(45) Date of Patent: Sep. 14, 2021

(54) METHOD FOR TRANSMITTING UPLINK CHANNEL IN WIRELESS COMMUNICATION SYSTEM, AND APPARATUS THEREFOR

(71) Applicant: LG ELECTRONICS INC., Seoul (KR)

(72) Inventors: Kyuhwan Kwak, Seoul (KR); Yunjung Yi, Seoul (KR); Daesung Hwang, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 16 days.

(21) Appl. No.: 16/346,407

(22) PCT Filed: Nov. 2, 2017

(86) PCT No.: PCT/KR2017/012351
§ 371 (c)(1),
(2) Date: Apr. 30, 2019

(87) PCT Pub. No.: WO2018/084610
PCT Pub. Date: May 11, 2018

(65) Prior Publication Data
US 2019/0261383 A1 Aug. 22, 2019

Related U.S. Application Data

(60) Provisional application No. 62/417,472, filed on Nov. 4, 2016, provisional application No. 62/417,311, filed on Nov. 3, 2016.

(51) Int. Cl.
*H04L 1/18* (2006.01)
*H04L 5/00* (2006.01)
(Continued)

(52) U.S. Cl.
CPC ........... *H04W 72/10* (2013.01); *H04L 1/1819* (2013.01); *H04L 5/00* (2013.01); *H04L 5/0055* (2013.01);
(Continued)

(58) Field of Classification Search
CPC ... H04L 1/1607; H04L 1/1819; H04L 1/1861; H04L 1/1896; H04L 5/00; H04L 5/0053;
(Continued)

(56) References Cited

U.S. PATENT DOCUMENTS 8,948,111 B2 * 2/2015 Chen ................. H04W 72/0406
370/329
9,167,576 B2 * 10/2015 Yang .................... H04L 1/0026
(Continued)

FOREIGN PATENT DOCUMENTS

WO 2016/163623 A1 10/2016

*Primary Examiner* — Alpus Hsu
(74) *Attorney, Agent, or Firm* — Dentons US LLP

(57) ABSTRACT

Disclosed are a method for transmitting an uplink channel in a wireless communication system, and an apparatus therefor. Specifically, a method by which a terminal transmits uplink control information comprises the steps of: identifying a resource region allocated to a first uplink control channel for transmitting first uplink control information, and a resource region allocated to a second uplink control channel for transmitting second uplink control information; and transmitting a specific modulation symbol to a base station using a specific uplink resource, if the transmission of the first uplink control channel and the transmission of the second uplink control channel overlap.

15 Claims, 16 Drawing Sheets

(51) Int. Cl.
*H04W 72/04* (2009.01)
*H04W 72/10* (2009.01)
*H04W 88/02* (2009.01)

(52) U.S. Cl.
CPC ........... *H04L 5/0082* (2013.01); *H04W 72/04* (2013.01); *H04W 72/0413* (2013.01); *H04W 72/0446* (2013.01); *H04W 88/02* (2013.01)

(58) Field of Classification Search
CPC .... H04L 5/0055; H04L 5/0082; H04W 72/04; H04W 72/0413; H04W 72/0446; H04W 72/10; H04W 72/1242; H04W 88/02
See application file for complete search history.

(56) References Cited

U.S. PATENT DOCUMENTS

| | | | |
|---|---|---|---|
| 9,462,573 B2 | 10/2016 | Seo et al. | |
| 9,577,792 B2* | 2/2017 | Kim | H04L 27/2614 |
| 9,807,707 B2* | 10/2017 | Shimezawa | H04W 52/325 |
| 9,854,569 B2* | 12/2017 | Yang | H04L 5/0053 |
| 10,243,720 B2* | 3/2019 | Lee | H04L 5/0066 |
| 10,541,785 B2* | 1/2020 | Papasakellariou | H04W 72/1278 |
| 2013/0044831 A1 | 2/2013 | Narasimha et al. | |
| 2014/0092790 A1 | 4/2014 | Zhang et al. | |
| 2014/0269454 A1* | 9/2014 | Papasakellariou | H04L 5/0092 370/280 |
| 2014/0376471 A1* | 12/2014 | Nishio | H04W 52/367 370/329 |
| 2015/0036566 A1* | 2/2015 | Blankenship | H04W 72/0413 370/311 |
| 2015/0049699 A1* | 2/2015 | Takeda | H04W 76/15 370/329 |
| 2016/0021653 A1 | 1/2016 | Papasakellariou et al. | |
| 2018/0076942 A1* | 3/2018 | Nory | H04L 5/0055 |
| 2018/0139014 A1* | 5/2018 | Xiong | H04L 1/1861 |
| 2019/0158263 A1* | 5/2019 | Lee | H04L 5/006 |
| 2019/0296879 A1* | 9/2019 | Kwak | H04L 27/20 |

\* cited by examiner

[FIG. 1]
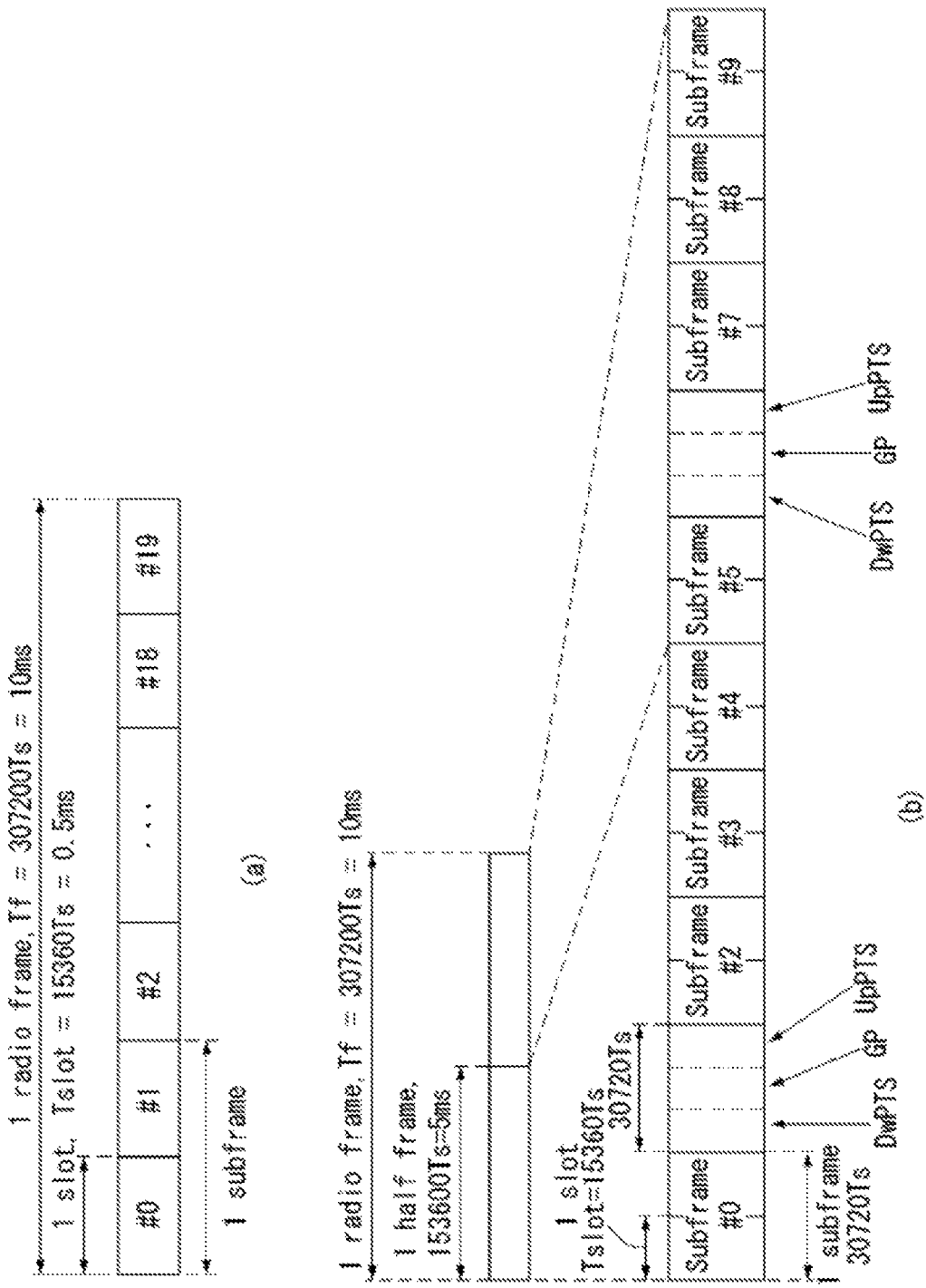

[FIG. 2]
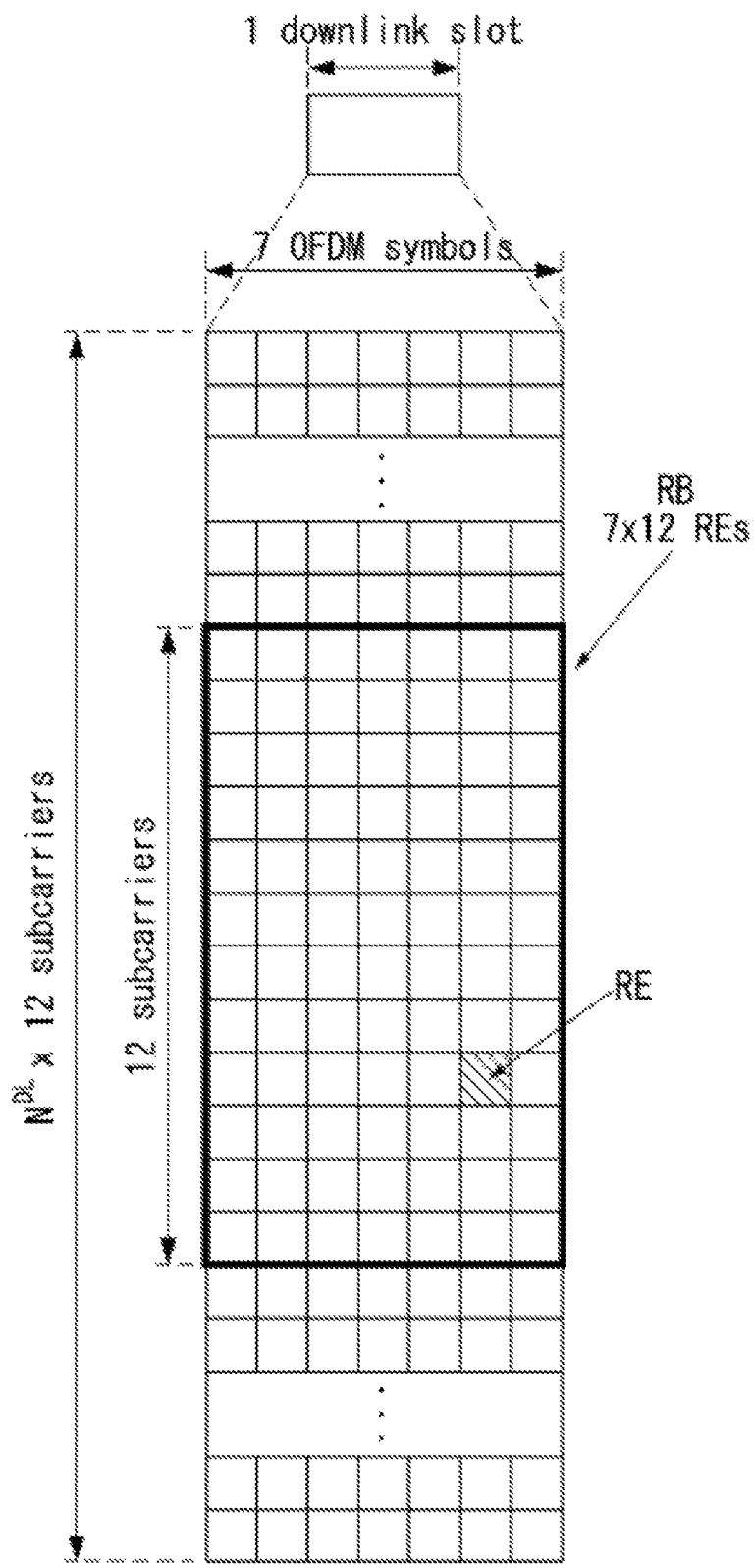

[FIG. 3]
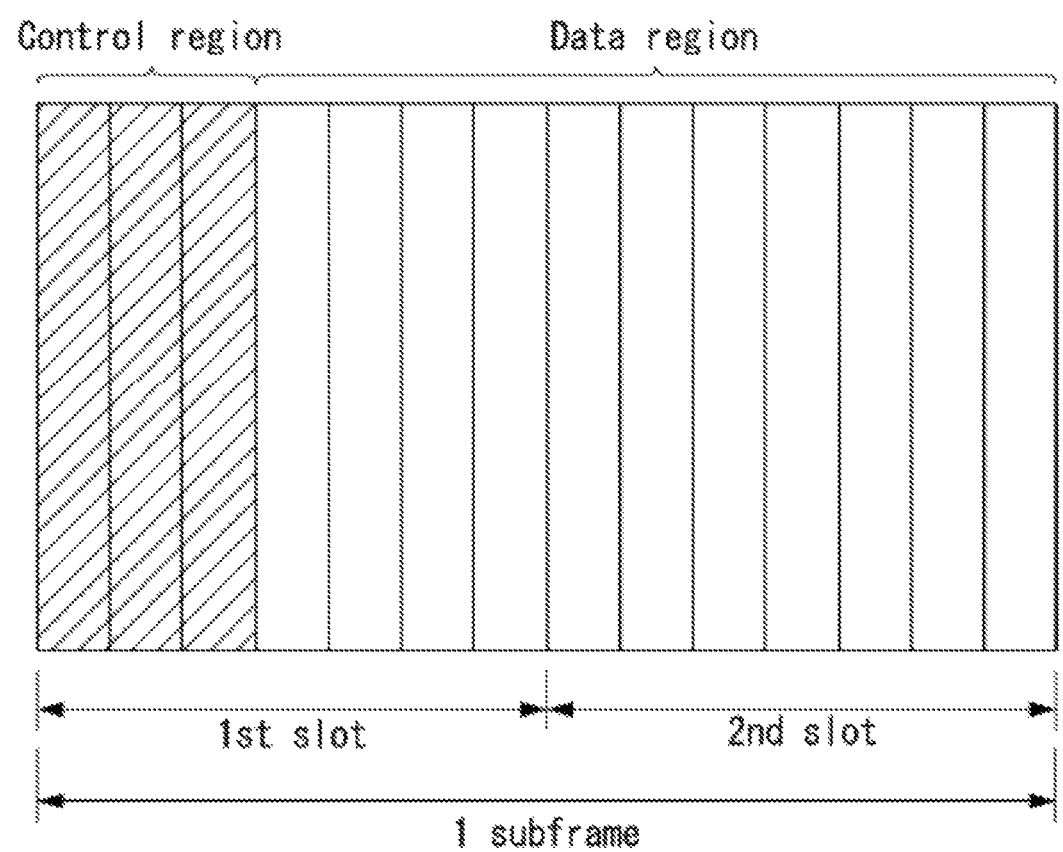
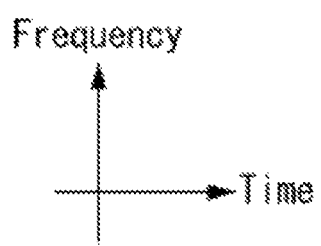

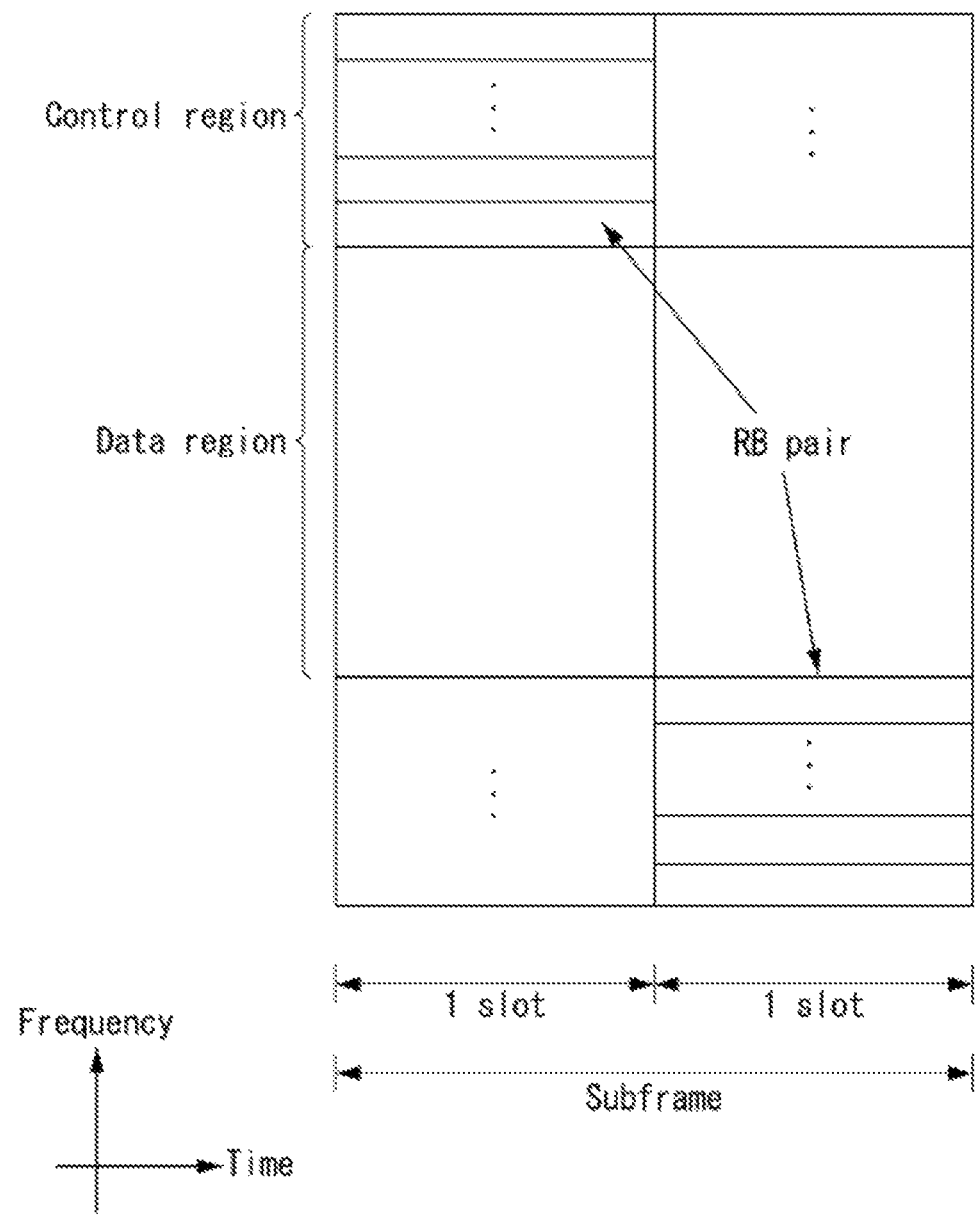
[FIG 4]

[FIG. 5]
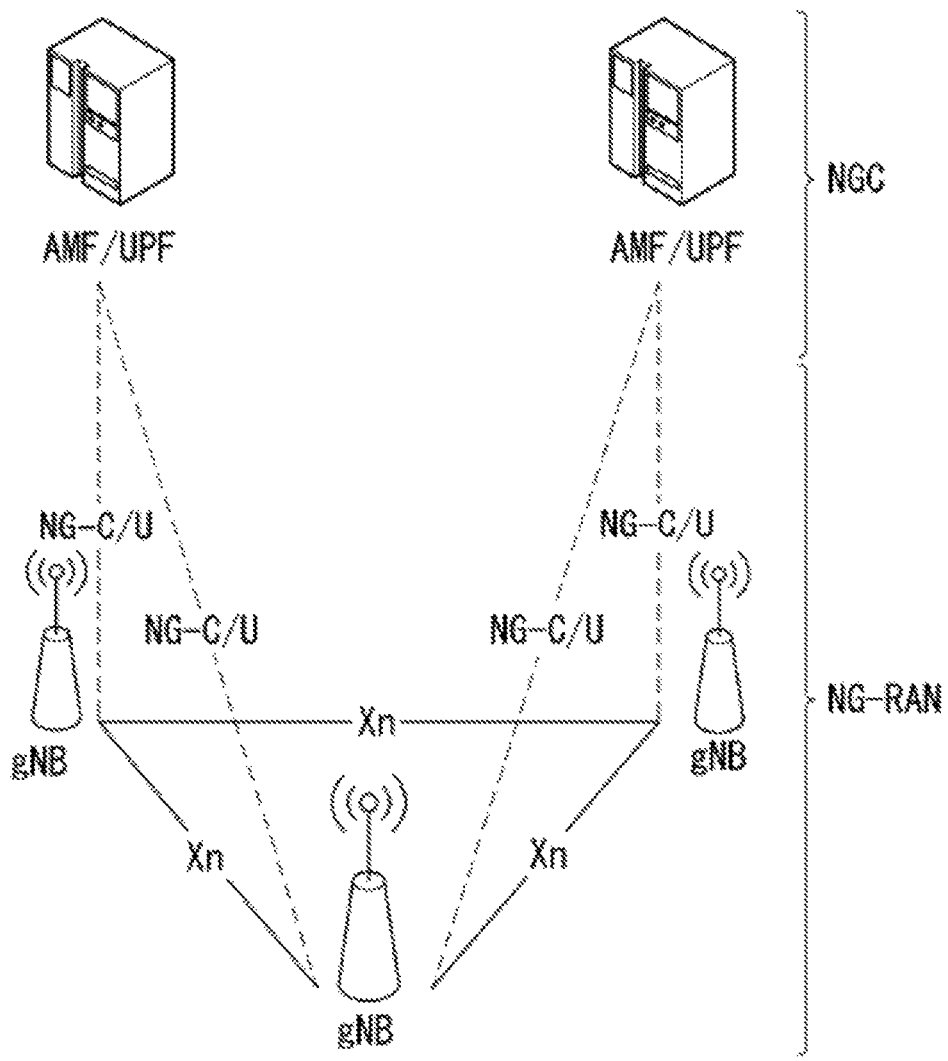

[FIG. 6]
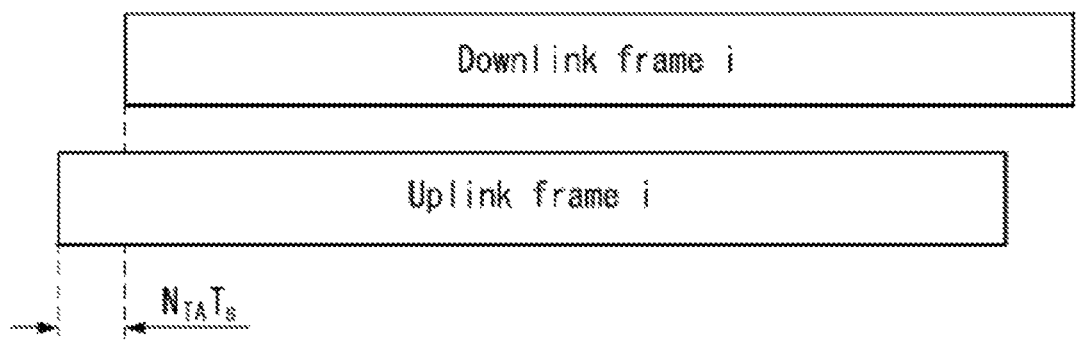

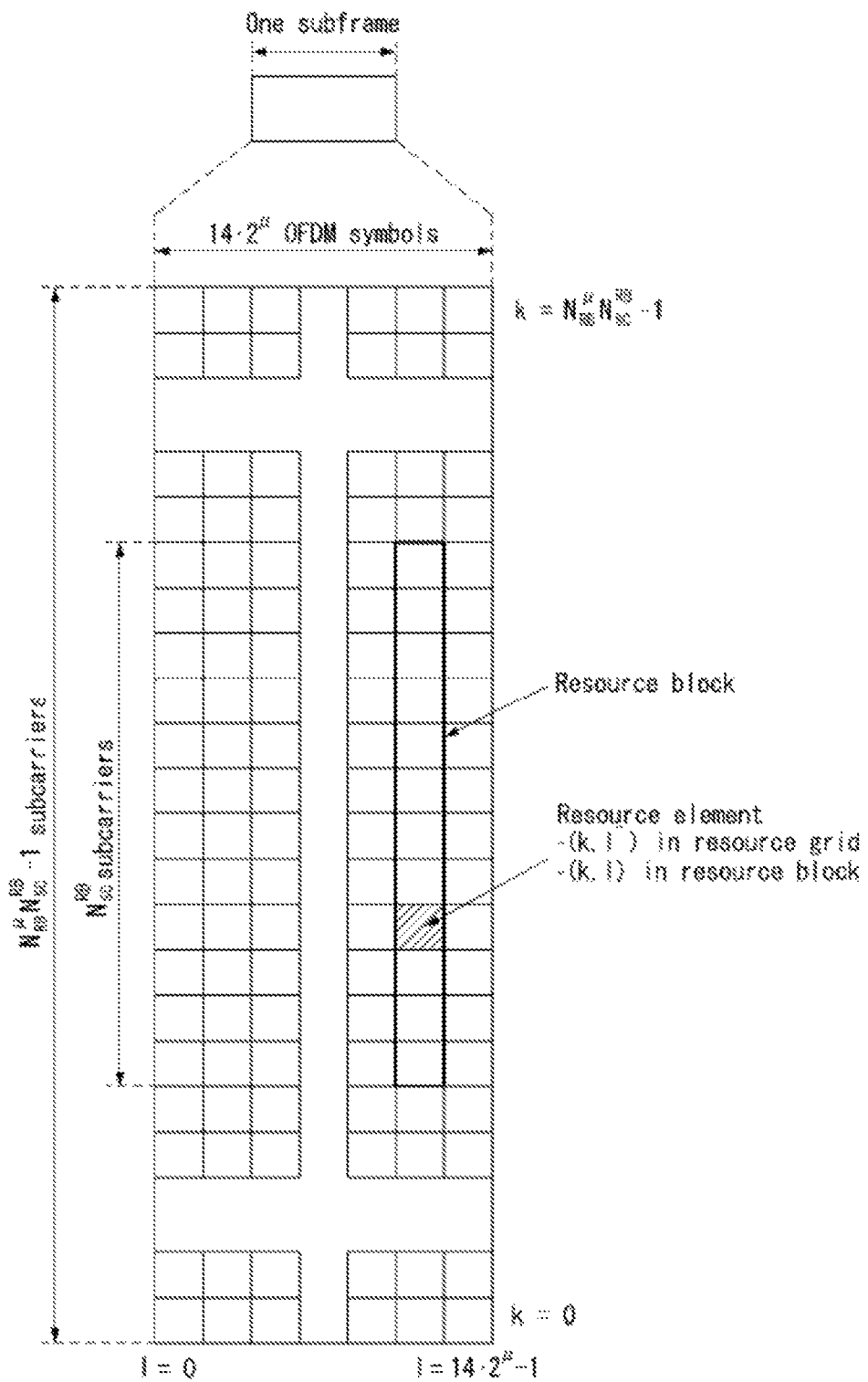
[FIG. 7]

[FIG. 8]
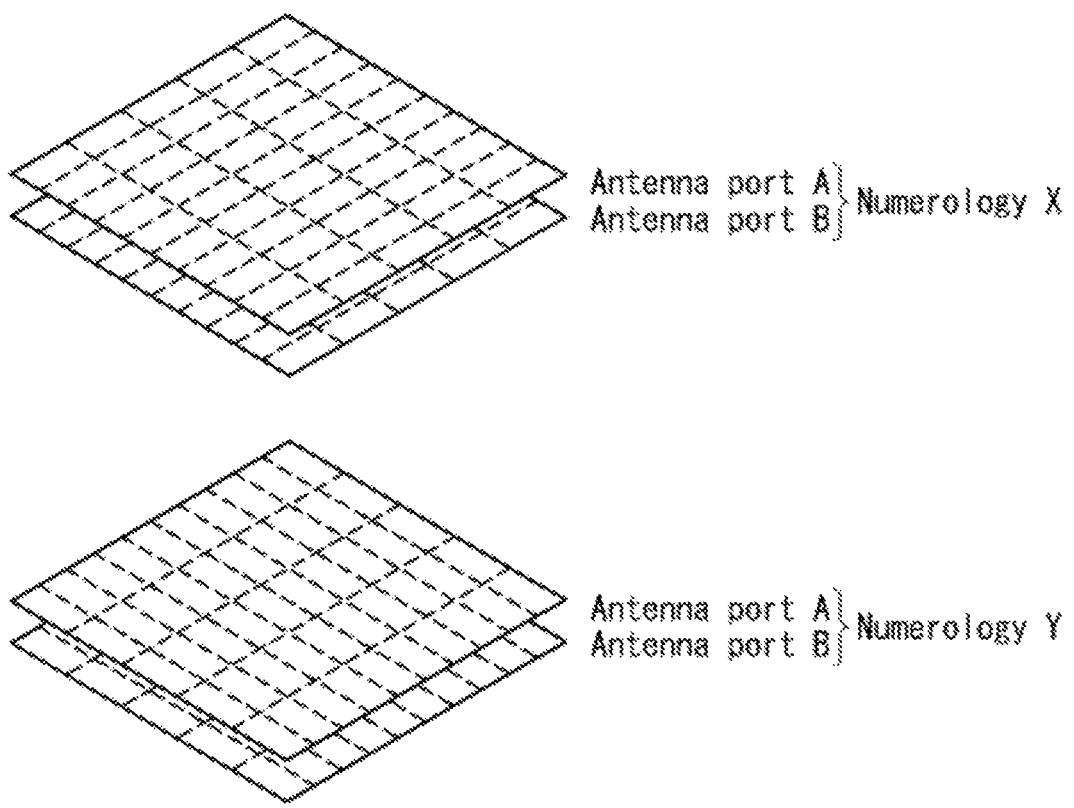

[FIG. 9]
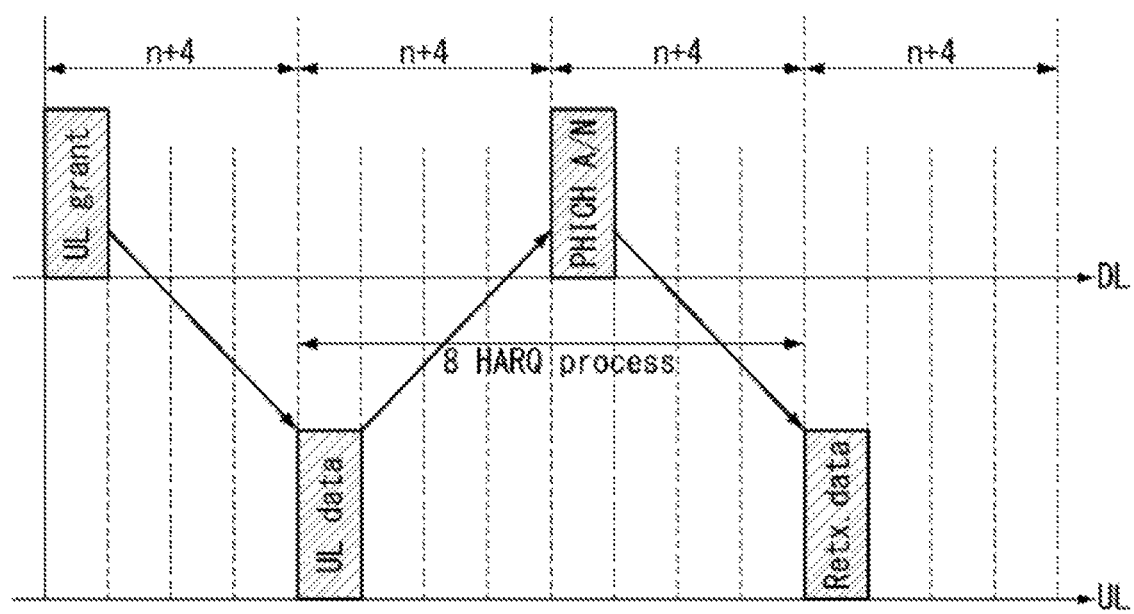

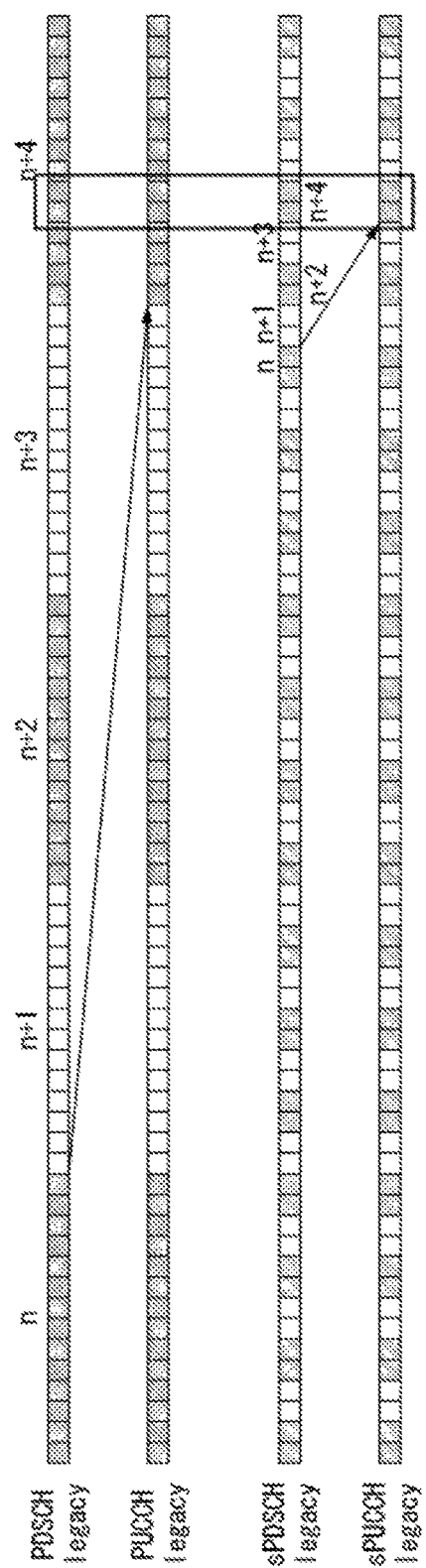
[FIG. 10]

[FIG. 11]
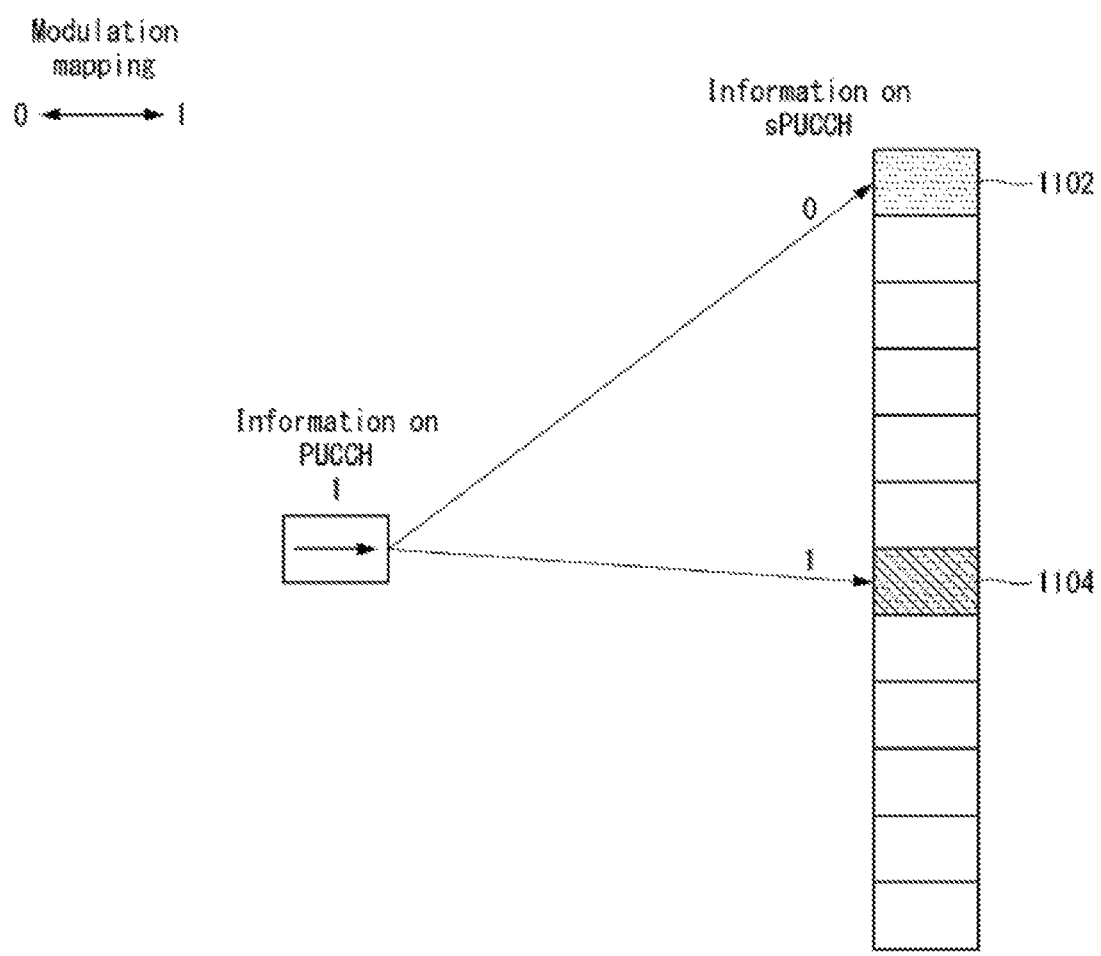

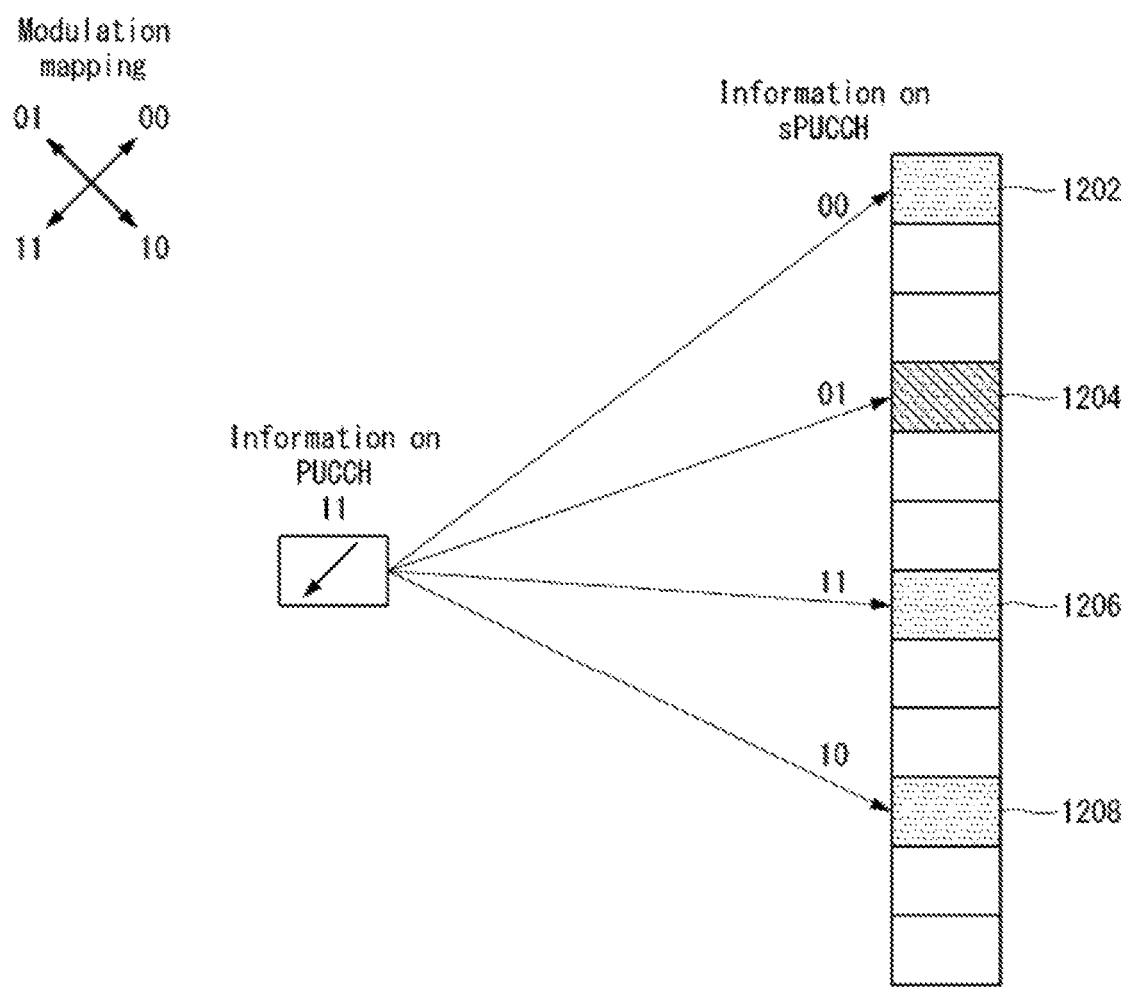

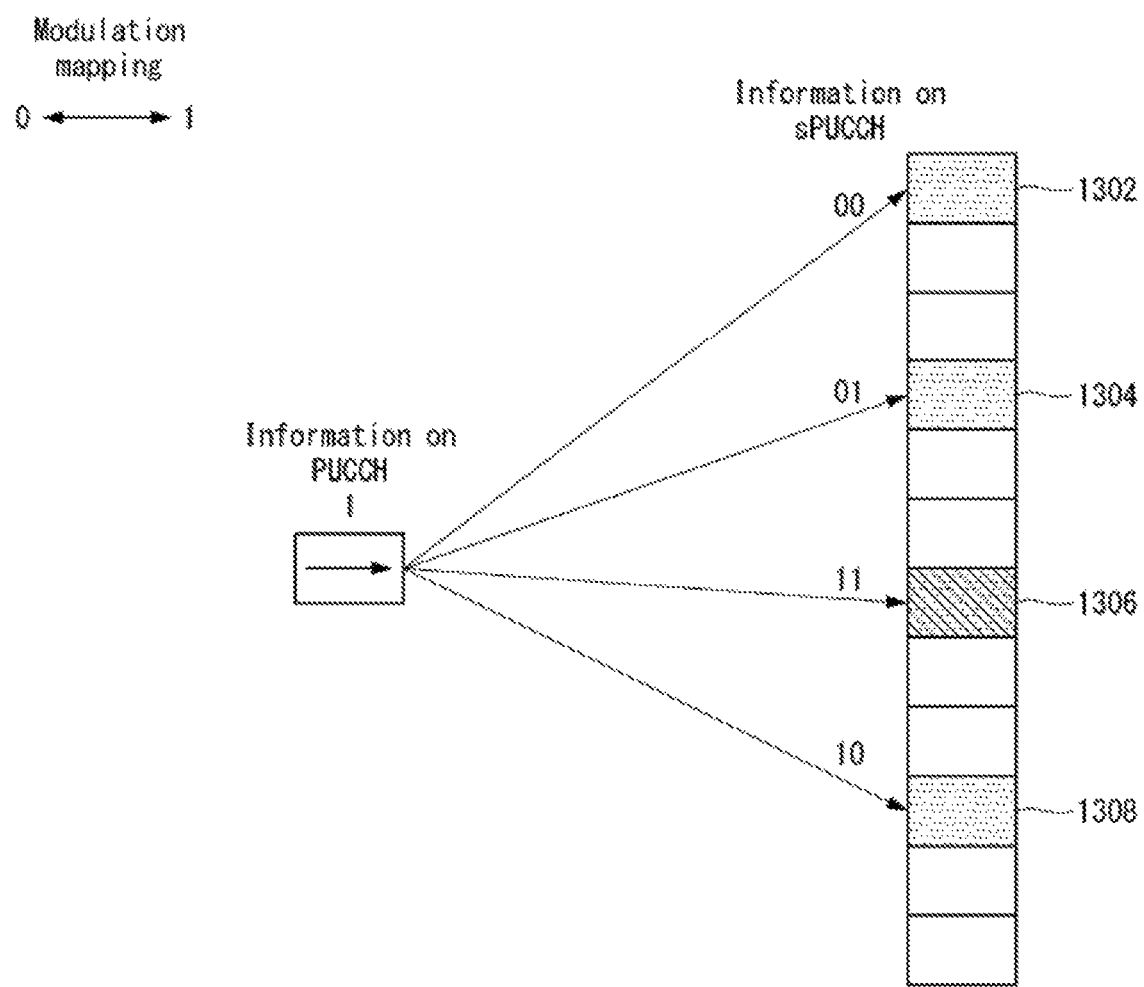
[FIG. 13]

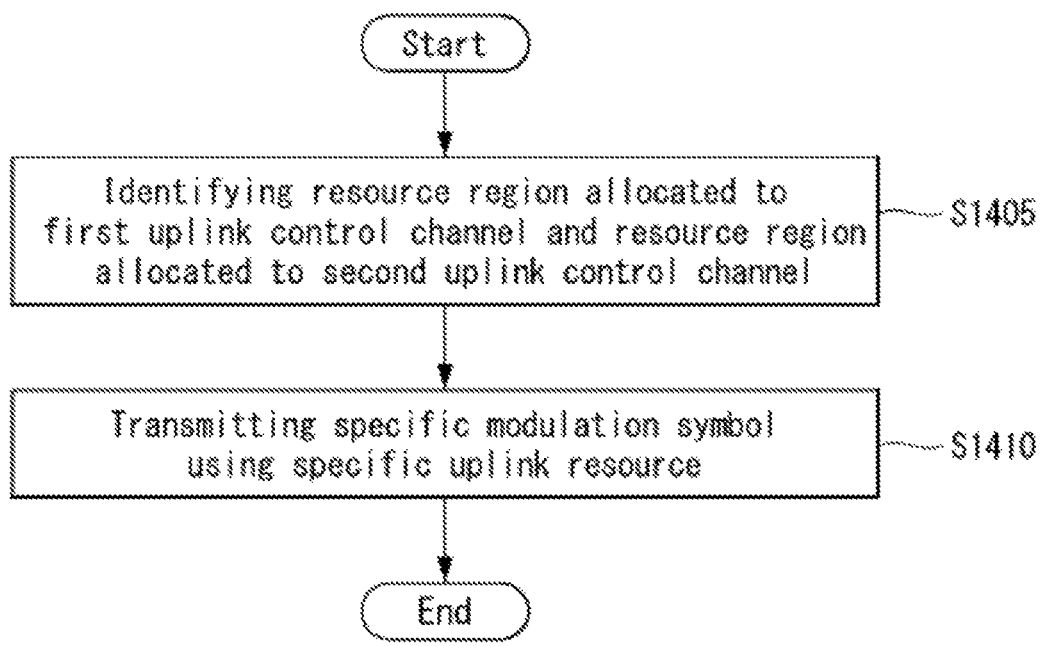

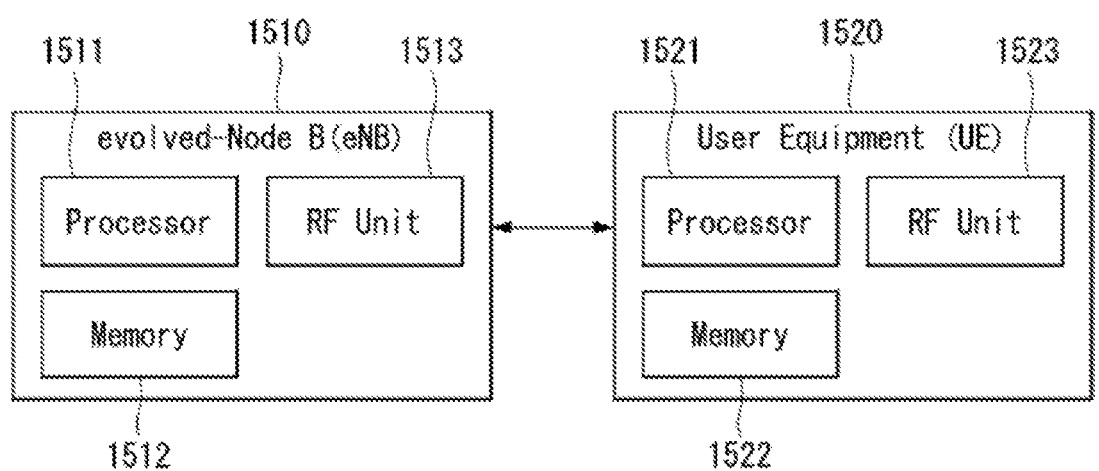
[FIG. 15]

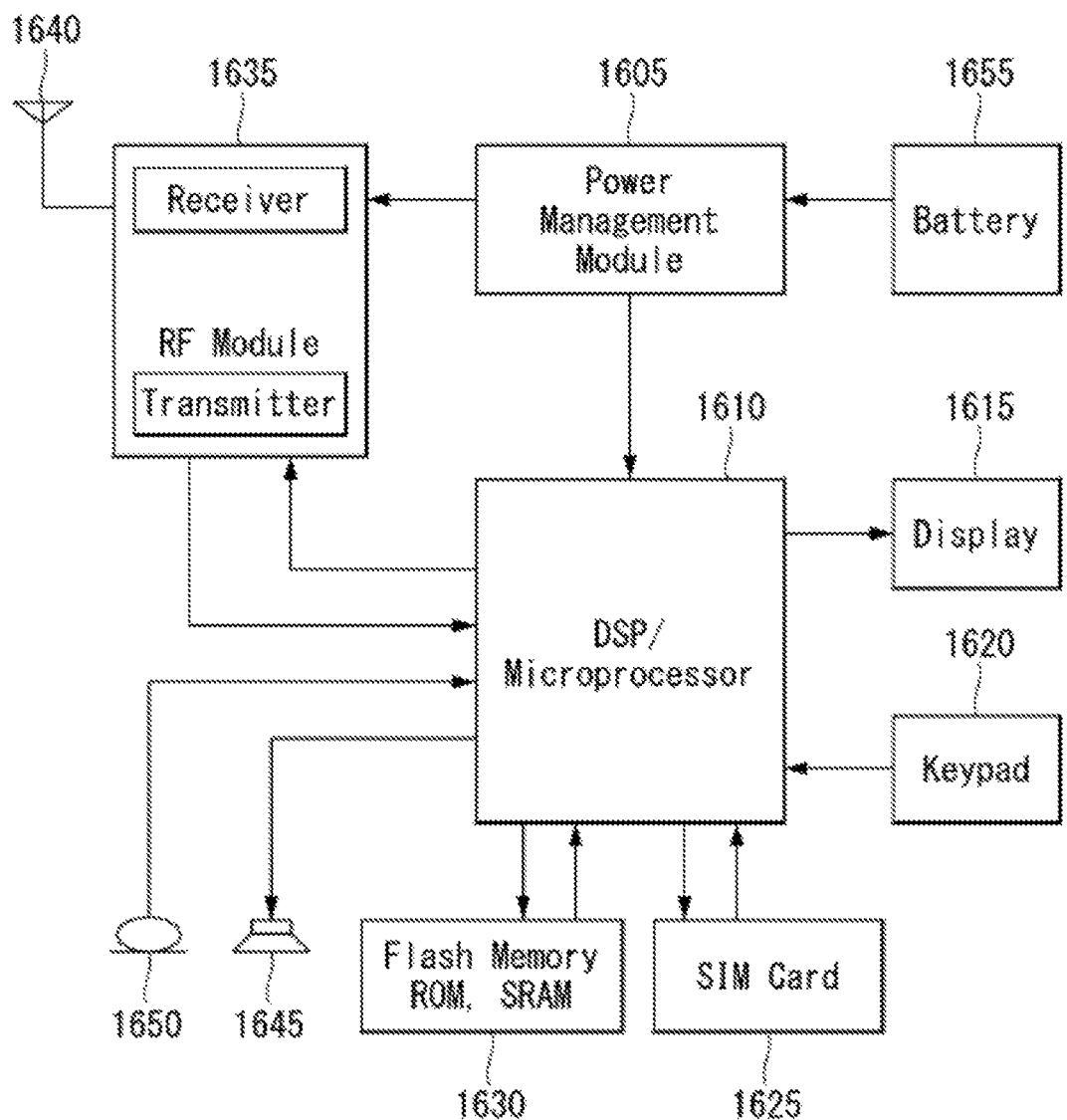
[FIG. 16]

METHOD FOR TRANSMITTING UPLINK CHANNEL IN WIRELESS COMMUNICATION SYSTEM, AND APPARATUS THEREFOR

This application is a 35 USC § 371 National Stage entry of International Application No. PCT/KR2017/012351, filed on Nov. 2, 2017, which claims priority to U.S. Provisional Application No. 62/417,311, filed on Nov. 3, 2016, and U.S. Provisional Application No. 62/417,472, filed on Nov. 4, 2016 all of which are incorporated by reference in their entirety herein.

TECHNICAL FIELD

The present invention relates to a wireless communication system, and more particularly, to a method for transmitting an uplink channel by a user equipment (UE) and a device supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DETAILED DESCRIPTION OF INVENTION

Technical Problem

The present disclosure proposes a method for transmitting an uplink channel (e.g., PUCCH, PUSCH) by a UE.

In this regard, the present disclosure proposes a method for transmitting uplink control information when the uplink channels to be transmitted by the UE are overlapped.

Specifically, the present disclosure proposes a method for transmitting the uplink control information by applying a bundling scheme to information to be transmitted through overlapping uplink channels.

In addition, the present disclosure proposes a method for transmitting the uplink control information by applying a modulation scheme and a channel selection scheme to information to be transmitted through overlapping uplink channels.

Technical objects to be achieved by the present invention are not limited to the aforementioned technical objects, and other technical objects not described above may be evidently understood by a person having ordinary skill in the art to which the present invention pertains from the following description.

Technical Solution

A method for transmitting uplink control information by a user equipment (UE) in a wireless communication system according to an embodiment of the present invention, the method includes identifying a resource region allocated to a first uplink control channel for transmitting first uplink control information and a resource region allocated to a second uplink control channel for transmitting second uplink control information, and transmitting, to a base station, a specific modulation symbol using a specific uplink resource, when transmission of the first uplink control channel overlaps transmission of the second uplink control channel, wherein the specific uplink resource and the specific modulation symbol are configured based on a priority between the first uplink control channel and the second uplink control channel, wherein the specific uplink resource indicates the first uplink control information, and wherein the specific modulation symbol corresponds to the second uplink control information.

Furthermore, in the method according an embodiment of the present invention, the first uplink control channel may have a higher priority than the second uplink control channel.

Furthermore, in the method according an embodiment of the present invention, a number of symbols allocated to the first uplink control channel may be configured to be less than a number of symbols allocated to the second uplink control channel.

Furthermore, in the method according an embodiment of the present invention, the first uplink control information may include at least one of ACK/NACK information and a scheduling request, and the second uplink control information may include channel state information.

Furthermore, in the method according an embodiment of the present invention, the first uplink control channel may be a short physical uplink control channel (PUCCH), and the second uplink control channel may be a long PUCCH.

Furthermore, in the method according an embodiment of the present invention, the first uplink control channel may be configured based on a first transmission time interval, the second uplink control channel may be configured based on a second transmission time interval, and the first transmission time interval may be shorter than the second transmission time interval.

Furthermore, in the method according an embodiment of the present invention, the transmission of the specific modulation symbol using the specific uplink resource may be performed according to the first time transmission interval.

Furthermore, the method according an embodiment of the present invention may further include receiving, from the base station, a first downlink shared channel, and receiving, from the base station, a second downlink shared channel. The first uplink control information may include ACK/NACK information on the first downlink shared channel, and the second uplink control information may include ACK/NACK information on the second downlink shared channel.

Furthermore, in the method according an embodiment of the present invention, the specific uplink resource may be one of a plurality of uplink resources predetermined for uplink control channel transmission, and the predetermined plurality of uplink resources may be configured according to at least one control channel element index among a first downlink control channel corresponding to the first downlink shared channel or a second downlink control channel corresponding to the second downlink shared channel.

Furthermore, the method according an embodiment of the present invention may further include receiving, from the base station, uplink resource configuration information representing a plurality of uplink resources predetermined for uplink control channel transmission. The specific uplink resource may be one of the predetermined plurality of uplink resources.

Furthermore, in the method according an embodiment of the present invention, the predetermined plurality of uplink resources may be configured based on an offset between a default uplink resource and uplink resources.

Furthermore, in the method according an embodiment of the present invention, the specific modulation symbol may correspond to a binary phase shift keying (BPSK) modulation symbol or a quadrature phase shift keying (QPSK) modulation symbol.

A user equipment (UE) for transmitting uplink control information in a wireless communication system according to another embodiment of the present invention, the UE includes a radio frequency (RF) unit for transmitting and receiving a wireless signal, and a processor functionally connected to the RF unit, wherein the processor is configured to control to identify a resource region allocated to a first uplink control channel for transmitting first uplink control information and a resource region allocated to a second uplink control channel for transmitting second uplink control information, and transmit, to a base station, a specific modulation symbol using a specific uplink resource when transmission of the first uplink control channel overlaps transmission of the second uplink control channel, wherein the specific uplink resource and the specific modulation symbol are configured based on a priority between the first uplink control channel and the second uplink control channel, wherein the specific uplink resource indicates the first uplink control information, and wherein the specific modulation symbol corresponds to the second uplink control information.

Furthermore, in the UE according to an embodiment of the present invention, the first uplink control channel may have a higher priority than the second uplink control channel.

Furthermore, in the UE according to an embodiment of the present invention, a number of symbols allocated to the first uplink control channel may be configured to be less than a number of symbols allocated to the second uplink control channel.

Advantageous Effects

According to an embodiment of the present invention, it is possible to transmit all information to be transmitted through the uplink channels without dropping some of the overlapped channels even when the uplink channels (for example, a short PUCCH and a long PUCCH) overlap at the same time.

Furthermore, according to an embodiment of the present invention, the information on a channel having a high priority is divided into resources having orthogonality, thereby increasing the decoding probability.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings included as part of the detailed description in order to help understanding of the present invention provide embodiments of the present invention, and describe the technical characteristics of the present invention along with the detailed description.

FIG. 1 illustrates the structure of a radio frame in a wireless communication system to which the present invention may be applied.

FIG. 2 is a diagram illustrating a resource grid for one downlink slot in a wireless communication system to which the present invention may be applied.

FIG. 3 illustrates the structure of a downlink subframe in a wireless communication system to which the present invention may be applied.

FIG. 4 illustrates the structure of an uplink subframe in a wireless communication system to which the present invention may be applied.

FIG. 5 is a diagram illustrating an example of an overall structure of a new radio (NR) system to which a method proposed by the present disclosure may be applied.

FIG. 6 illustrates a relationship between an uplink frame and a downlink frame in a wireless communication system to which a method proposed by the present disclosure may be applied.

FIG. 7 illustrates an example of a resource grid supported in a wireless communication system to which a method proposed by the present disclosure may be applied.

FIG. 8 illustrates examples of resource grids for each antenna port and numerology to which a method proposed by the present disclosure may be applied.

FIG. 9 illustrates an example of a synchronous HARQ operation in an uplink to which a method proposed by the present disclosure may be applied.

FIG. 10 shows an example of an overlap between uplink channels to which a method proposed by the present disclosure may be applied.

FIG. 11 shows an example of a method for transmitting uplink control information which a method proposed by the present disclosure may be applied.

FIG. 12 shows another example of a method for transmitting uplink control information to which a method proposed by the present disclosure may be applied.

FIG. 13 shows other example of a method for transmitting uplink control information to which a method proposed by the present disclosure may be applied.

FIG. 14 is a flowchart illustrating an operation of a UE for transmitting uplink control information to which a method proposed by the present disclosure may be applied.

FIG. 15 illustrates a block diagram of a wireless communication device to which methods proposed by the present disclosure may be applied.

FIG. 16 illustrates a block diagram of a communication device according to an embodiment of the present invention.

MODE FOR INVENTION

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), a generation NodeB (gNB), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A/New RAT (NR) is primarily described for clear description, but technical features of the present invention are not limited thereto.

General LTE System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

In FIG. 1, the size of the radio frame in the time domain is represented by a multiple of a time unit of $T\_s=1/(15000*2048)$. The downlink and uplink transmissions are composed of radio frames having intervals of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_{slot}=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink The OFDM symbol may also be called an SC-FDMA symbol or a symbol period. The resource block is a resource allocation unit and includes a plurality of contiguous sub-carriers in one slot.

FIG. 1(b) shows the type 2 radio frame structure. The type 2 radio frame structure includes 2 half frames each having a length of $153600*T\_s=5$ ms. Each of the half frames includes 5 subframes each having a length of $30720*T\_s=1$ ms.

In the type 2 radio frame structure of a TDD system, an uplink-downlink configuration is a rule showing how uplink and downlink are allocated (or reserved) with respect to all of subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "T_slot=15360*T_s=0.5 ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information Like scheduling information, the configuration information may be transmitted through a physical downlink control channel (PDCCH) and may be transmitted to all of UEs within a cell in common through a broadcast channel as broadcast information.

Table 2 shows a configuration (i.e., the length of a DwPTS/GP/UpPTS) of the special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$  | $2192 \cdot T_s$ | $2560 \cdot T_s$ | $7680 \cdot T_s$  | $2192 \cdot T_s$ | $2560 \cdot T_s$ |
| 1 | $19760 \cdot T_s$ |                  |                  | $20480 \cdot T_s$ |                  |                  |
| 2 | $21952 \cdot T_s$ |                  |                  | $23040 \cdot T_s$ |                  |                  |
| 3 | $24144 \cdot T_s$ |                  |                  | $25600 \cdot T_s$ |                  |                  |
| 4 | $26336 \cdot T_s$ |                  |                  | $7680 \cdot T_s$  | $4384 \cdot T_s$ | $5120 \cdot T_s$ |
| 5 | $6592 \cdot T_s$  | $4384 \cdot T_s$ | $5120 \cdot T_s$ | $20480 \cdot T_s$ |                  |                  |
| 6 | $19760 \cdot T_s$ |                  |                  | $23040 \cdot T_s$ |                  |                  |
| 7 | $21952 \cdot T_s$ |                  |                  | —                 | —                | —                |
| 8 | $24144 \cdot T_s$ |                  |                  | —                 | —                | —                |

The structure of the radio frame according to the example of FIG. 1 is only one example. The number of subcarriers included in one radio frame, the number of slots included in one subframe, and the number of OFDM symbols included in one slot may be changed in various manners.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Enhanced PDCCH (EPDCCH) carries UE-specific signaling. The EPDCCH is located in a physical resource block (PRB) that is set to be terminal specific. In other words, as described above, the PDCCH can be transmitted in up to three OFDM symbols in the first slot in the subframe, but the EPDCCH can be transmitted in a resource region other than the PDCCH. The time (i.e., symbol) at which the EPDCCH in the subframe starts may be set in the UE through higher layer signaling (e.g., RRC signaling, etc.).

The EPDCCH is a transport format, a resource allocation and HARQ information associated with the DL-SCH and a transport format, a resource allocation and HARQ information associated with the UL-SCH, and resource allocation information associated with SL-SCH (Sidelink Shared Channel) and PSCCH Information, and so on. Multiple EPDCCHs may be supported and the terminal may monitor the set of EPCCHs.

The EPDCCH can be transmitted using one or more successive advanced CCEs (ECCEs), and the number of ECCEs per EPDCCH can be determined for each EPDCCH format.

Each ECCE may be composed of a plurality of enhanced resource element groups (EREGs). EREG is used to define the mapping of ECCE to RE. There are 16 EREGs per PRB pair. All REs are numbered from 0 to 15 in the order in which the frequency increases, except for the RE that carries the DMRS in each PRB pair.

The UE can monitor a plurality of EPDCCHs. For example, one or two EPDCCH sets may be set in one PRB pair in which the terminal monitors the EPDCCH transmission.

Different coding rates can be realized for the EPCCH by merging different numbers of ECCEs. The EPCCH may use localized transmission or distributed transmission, which may result in different mapping of the ECCE to the REs in the PRB.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to the PUCCH for one terminal. RBs included in the RB pair occupy different subcarriers in two slots, respectively. The RB pair allocated to the PUCCH frequency-hops in a slot boundary.

General NR System

As smartphones and Internet of Things (IoT) terminals spread rapidly, the amount of information exchanged through the communication network is increasing. Accordingly, it is necessary to consider an environment (e.g., enhanced mobile broadband communication) that provides faster service to more users than existing communication systems (or existing radio access technology) in the next generation wireless access technology.

To this end, a design of a communication system considering Machine Type Communication (MTC) that provides services by connecting a plurality of devices and objects is being discussed. In addition, a design of a communication system (for example, Ultra-Reliable and Low Latency Communication (URLLC) considering a service and/or a terminal sensitive to reliability and/or latency of communication is also discussed.

Hereinafter, in the present disclosure, for convenience of explanation, the next generation radio access technology is referred to as NR (New RAT, Radio Access Technology), and the wireless communication system to which the NR is applied is referred to as an NR system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

FIG. 5 is a diagram illustrating an example of an overall structure of a new radio (NR) system to which a method proposed by the present disclosure may be implemented.

Referring to FIG. 5, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 3.

TABLE 3

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$ this case, $\Delta f_{max}=480 \cdot 10^3$, and $N_f=4096$ DL and UL transmission is configured as a radio frame $T_f=(\Delta f_{max} \cdot N_f/100) T_s=10$ ms having a section of The radio frame is composed of ten subframes each having a section of $T_{sf}=(\Delta f_{max} \cdot N_f/1000) T_s=1$ ms. In this case, there may be a set of UL frames and a set of DL frames.

FIG. 6 illustrates a relationship between a UL frame and a DL frame in a wireless communication system to which a method proposed by the present disclosure may be implemented.

As illustrated in FIG. 6, a UL frame number I from a user equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{frame}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 4 shows the number of OFDM symbols per slot for a normal CP in the numerology μ, and Table 5 shows the number of OFDM symbols per slot for an extended CP in the numerology μ.

TABLE 4

| | Slot configuration | | | | | |
|---|---|---|---|---|---|---|
| | 0 | | | 1 | | |
| μ | $N_{symb}^\mu$ | $N_{frame}^{slot,\mu}$ | $N_{subframe}^{slot,\mu}$ | $N_{symb}^\mu$ | $N_{frame}^{slot,\mu}$ | $N_{subframe}^{slot,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |

TABLE 4-continued

| | | | | Slot configuration | | |
|---|---|---|---|---|---|---|
| | | 0 | | | 1 | |
| $\mu$ | $N_{symb}^{\mu}$ | $N_{frame}^{slot, \mu}$ | $N_{subframe}^{slot, \mu}$ | $N_{symb}^{\mu}$ | $N_{frame}^{slot, \mu}$ | $N_{subframe}^{slot, \mu}$ |
| 4 | 14 | 160 | 16 | — | — | — |
| 5 | 14 | 320 | 32 | — | — | — |

TABLE 5

| | | | | Slot configuration | | |
|---|---|---|---|---|---|---|
| | | 0 | | | 1 | |
| $\mu$ | $N_{symb}^{\mu}$ | $N_{frame}^{slot, \mu}$ | $N_{subframe}^{slot, \mu}$ | $N_{symb}^{\mu}$ | $N_{frame}^{slot, \mu}$ | $N_{subframe}^{slot, \mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 7 illustrates an example of a resource grid supported in a wireless communication system to which a method proposed by the present disclosure may be implemented.

Referring to FIG. 7, a resource grid is composed of $N_{RB}^{\mu} N_{sc}^{RB}$ subcarriers in a frequency domain, each subframe composed of 14.2 μOFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 8, one resource grid may be configured for the numerology μ and an antenna port p.

FIG. 8 illustrates examples of resource grids for each antenna port and numerology to which a method proposed in this specification may be applied.

Each element of the resource grid for the numerology μ and the antenna port p is indicated as a resource element, and may be uniquely identified by an index pair (k,l). Herein, $k=0, \ldots, N_{RB}^{\mu} N_{sc}^{RB}-1$ is an index in the frequency domain, and $l=0, \ldots, 2^{\mu} N_{symb}^{(\mu)}-1$ indicates a location of a symbol in a subframe. To indicate a resource element in a slot, the index pair (k,l) is used. Herein, $l=0, \ldots, N_{symb}^{\mu}-1$.

The resource element (k,l) for the numerology μ and the antenna port p corresponds to a complex value $a_{k,l}^{(p,\mu)}$. When there is no risk of confusion or when a specific antenna port or numerology is specified, the indexes p and μ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{pRB}$ and the resource elements (k,l) may be given as in Equation 1.

$$n_{PRB} = \left[ \frac{k}{N_{sc}^{RB}} \right]$$ [Equation 1]

In addition, regarding a carrier part, a UE may be configured to receive or transmit the carrier part using only a subset of a resource grid. At this point, a set of resource blocks which the UE is configured to receive or transmit are numbered from 0 to $N_{RB}^{\mu}-1$ in the frequency region.

General HARQ Procedures

FIG. 9 illustrates an example of a synchronous HARQ operation in an uplink to which a method proposed by the present disclosure may be applied.

Referring to FIG. 9, a base station that has transmitted NACK transmits retransmission data to the same resource as initial data transmission by allocating a data resource for retransmission to a new resource configuring an NDI in an UL grant (DCI format 1) as a bit indicating retransmission, or omitting the UL grant. At this time, the retransmission timing is fixed to a subframe after 4 ms after receiving the NACK.

An HARQ scheme basically attempts error correction for a received code and determines whether or not to retransmit using a simple error detection code such as a Cyclic Redundancy Check (CRC). For retransmission, the HARQ scheme is divided into three types as follows, and LTE performs the HARQ scheme through CC (a second scheme) or IR (a third scheme).

1) Type-I HARQ Scheme: A receiving end discards a packet with errors and makes a retransmission request, and a transmitting end transmits the same packet as an initial transmission. This improves reliability of the system and improves performance through FEC by discarding the packet having errors.

2) Type-I HARQ Scheme with Chase Combining: Instead of discarding a packet having errors this is a scheme used to combine it with a retransmitted packet. By combining a plurality of packets as a result, the same effect as increasing the signal power can be obtained.

3) Type-II HARQ Scheme (Incremental redundancy Scheme): In case of Type-I, in order to prevent unnecessarily high redundancy codes from being transmitted during the initial transmission, it is a scheme to use a code with a high coding rate in the initial transmission and transmit additional redundancy when retransmission occurs.

TDD HAW) ACK/NACK Transmission

Hereinafter, ACK/NACK transmission for HARQ in LTE Time Division Duplex (TDD) will be described.

Unlike Frequency Division Duplex (FDD), a downlink subframe and an uplink subframe coexist in one radio frame in TDD. In the TDD frame, the number of uplink subframes may be less than or equal to the number of downlink subframes according to the UL-DL configuration. Accordingly, in case that the uplink subframe for transmitting an ACK/NACK signal (i.e., ACK/NACK information) is insufficient, a method of transmitting downlink transport blocks received in a plurality of downlink subframes or a plurality of ACK/NACK signals for PDSCH in one uplink subframe is supported.

In this case, two ACK/NACK modes such as ACK/NACK bundling and ACK/NACK multiplexing may be considered. The ACK/NACK bundling is a method of transmitting the ACK if a UE succeeds all in decoding of the received PDSCHs (or downlink transport blocks), and otherwise transmitting the NACK. To this end, the ACK or NACK for each PDSCH is compressed through a logical AND operation. The ACK/NACK multiplexing may be referred to as ACK/NACK channel selection (or channel selection). In the ACK/NACK multiplexing, the UE selects one PUCCH resource among a plurality of PUCCH resources to transmit the ACK/NACK.

Table 6 shows a downlink association set K: $\{k_0, k_1, \ldots K_{m-1}\}$ associated with a downlink subframe n-k associated with an uplink subframe n according to the uplink-downlink configuration. Here, M means the number of elements of the set K.

ACK/NACK Multiplexing

In a situation where the UE must simultaneously transmit a plurality of ACK/NACKs corresponding to a plurality of data units received from the base station, in order to maintain a single-frequency characteristic of the ACK/NACK signal, and reduce ACK/NACK transmission power, a method of the ACK/NACK multiplexing based on PUCCH resource selection may be considered.

Along with the ACK/NACK multiplexing, the contents of ACK/NACK responses for the plurality of data units are identified by a combination of the PUCCH resource used for an actual ACK/NACK transmission and resources of QPSK modulation symbols.

For example, if one PUCCH resource transmits 4 bits and 4 data units can be transmitted at a maximum, ACK/NACK results can be identified at the base station as shown in Table 7 below.

TABLE 7

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 7, HARQ-ACK(i) indicates an ACK/NACK result for an i-th data unit. In Table 7, Discontinuous Transmission (DTX) means that there is no data unit to be transmitted for corresponding HARQ-ACK(i) or that the UE can not detect a data unit corresponding to the HARQ-ACK (i).

According to Table 7, there are a maximum of 4 PUCCH resources ($n_{PUCCH,0}^{(1)}$, $n_{PUCCH,1}^{(1)}$, $n_{PUCCH,2}^{(1)}$ and $n_{PUCCH,3}^{(1)}$ and b (0), b (1) are 2 bits to be transmitted using the selected PUCCH. For example, if the UE successfully receives all 4 data units, the UE transmits 2 bits (1,1) using $n_{PUCCH,1}^{(1)}$. If the UE fails in decoding in first and third data units and succeeds in decoding in second and fourth data units, the UE transmits a bit (1,0) using $n_{PUCCH,3}^{(1)}$

TABLE 6

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the ACK/NACK channel selection, if there is at least one ACK, NACK and DTX are coupled. This is because a combination of reserved PUCCH resources and QPSK symbols cannot represent all ACK/NACK states. However, if there is no ACK, the DTX is decoupled from the NACK.

In a next generation communication system, a structure in which a transmission time interval (TTI) is configured to be short may be considered in order to reduce a delay time that may occur when information is transmitted or received. In addition, in the next generation communication system, a method of transmitting similar information (for example, HARQ ACK/NACK bits, etc.) through a channel (for example, a long PUCCH, a short PUCCH, etc.) having a different length may be considered in consideration of different coverage. Here, the next generation communication system may mean an enhanced LTE system or an NR system or the like.

In this case, in an environment where existing systems (for example, legacy LTE systems) and the next generation communication system coexist, it may happen that information to be transmitted in a short TTI and information to be transmitted in a long TTI are overlapped in a time domain (i.e., in timing). For example, the information to be transmitted in the short TTI may mean a channel configured in the short TTI, and the information to be transmitted in the long TTI may mean a channel configured to the long TTI. Here, the short TTI can be expressed as shortened TTI (sTTI). Furthermore, even in the next generation communication system, it may happen that the transmission of a channel (i.e., a channel having a large number of allocated symbols) configured to be longer in length and the transmission in a channel (i.e., a channel having a small number of allocated symbols) configured to be shorter in length are overlapped.

At this time, if the UE does not support required transmission power to maintain a single carrier property or to simultaneously transmit two information (or two channels) to be overlapped, a method of handling the overlap as described above needs to be considered.

The overlapping phenomenon as described above, regardless of similarity (or difference) of the contents to be delivered, may occur when there are information configured to have different TTIs and/or channels configured to have different lengths (i.e., the number of symbols). For example, even when two channels configured to have different lengths transmit (or deliver) different contents, it is needless to say that the above-described overlapping problem may occur.

That is, the overlapping phenomenon as described above can be generally occurred between a short transmission and a long transmission. In addition, such transmissions may be configured to be performed on different carriers (for example, uplink carriers), or may be configured to be performed on one (for example, single) carrier. Examples of such transmission are as follows.

For example, a long PUCCH that transmits HARQ ACK/NACK and/or a Scheduling Request (SR) and a short PUCCH that transmits HARQ ACK/NACK and/or SR may be overlapped (or collided). For another example, a long PUCCH that transmits channel state information (CSI) and a short PUCCH that transmits HARQ ACK/NACK and/or SR may be overlapped. For other example, a long PUCCH that transmits CSI and a short PUCCH that transmits CSI may be overlapped. For other example, a long PUCCH and a short PUCCH that transmit uplink control information (UCI) may be overlapped. For other example, a long PUSCH and a short PUCCH that piggyback UCI may be overlapped.

Herein, in the present specification, when an uplink control channel (e.g., PUCCH) is overlapped between the next generation communication system supporting the short TTI and a communication system supporting the long TTI, a method of controlling (or handling) such overlap is discussed. Furthermore, as described above, the corresponding method can be applied equally or similarly to the case where the overlap of the uplink control channel occurs in the next generation communication system supporting channels configured to have different lengths.

Furthermore, it is needless to say that the method can also be applied in the case of overlap between various uplink channels and/or overlap between side link channels and uplink channels as well as overlap between the uplink control channels.

Furthermore, the corresponding method can be applied similarly to the case of overlap between the uplink control channels configured to have the same length (or TTI) as well as overlap between the uplink control channels configured to have different lengths (i.e., the number of symbols) (or TTI).

Hereinafter, for convenience of explanation, in a system supporting the long TTI and a channel configured to be a long length, a downlink control channel is referred to as a Physical Downlink Control Channel (PDCCH), a downlink data channel (or downlink shared channel) is referred to as a Physical Downlink Shared Channel (PDSCH), a uplink control channel is referred to as a Physical Uplink Control Channel (PUCCH), an uplink data channel (or uplink shared channel) is referred to as a Physical Uplink Shared Channel (PUSCH). For example, in the present specification, the PUCCH may mean a long format PUCCH, a long PUCCH, or a legacy PUCCH of the NR system.

In this case, it is assumed that ACK/NACK feedback for downlink data transmission is transmitted through the PUCCH and ACK/NACK feedback for uplink data transmission is transmitted through the PDCCH or a Physical Hybrid ARQ Indication Channel (PHICH).

Furthermore, in case of a system supporting the short TTI and a channel configured to be a short length, each channel can be represented by adding 's' to the front of the corresponding channel. In other words, in this case, the downlink control channel is referred to as sPDCCH, the downlink data channel is referred to as sPDSCH, the uplink control channel is referred to as sPUCCH, and the uplink data channel is referred to as sPUSCH. For example, in the present specification, the sPUCCH may mean a short format PUCCH and a short PUCCH of the NR system.

As mentioned above, the sPUCCH can be used to transmit/receive information in a shorter granularity because the sPUCCH is configured to have a shorter TTI than PUCCH (or less number of symbols is allocated).

For example, when the UE receives data through the PDSCH and feeds back a decoding result (e.g., ACK/NACK information, CSI, SR, etc.) for the corresponding PDSCH through the PUCCH, a transmission timing of the corresponding PUCCH may be aligned with a long TTI unit (e.g., 1 ms unit) and its multiple length. Alternatively, in this case, the transmission timing of the PUCCH may be aligned with the number of symbols allocated to the PUCCH and its multiple length.

At this time, the UE additionally receives data through the sPDSCH, and a transmission timing of the sPUCCH for feedback of a decoding result for the sPDSCH may be aligned with a short TTI (i.e., sTTI) unit (e.g., a unit less than 1 ms) and its multiple length. Alternatively, in this case, the transmission timing of the sPUCCH may be aligned with the number of symbols allocated to the sPUCCH and its multiple length.

In this case, the sPDSCH and the sPUCCH are allocated (or configured) in units shorter than the PDSCH and the PUCCH. Accordingly, as shown in FIG. 10, the PUCCH and the sPUCCH to be transmitted by the UE may be overlapped and allocated (or configured) at the same time (e.g., the same symbol, the same subframe).

FIG. 10 shows an example of an overlap between uplink channels to which a method proposed by the present disclosure may be applied. FIG. 10 is merely for convenience of explanation and does not limit the scope of the present invention.

Referring to FIG. 10, it is assumed that a TTI value (for example, 14 symbol TTI) configured for PDSCH and PDCCH is larger than a TTI value (for example, 2 symbol TTI or 2 symbol sTTI) configured for sPDSCH and sPUCCH. That is, the number of symbols used for transmission of the PDSCH and PUCCH may be configured to be larger than the number of symbols used for transmission of the sPDSCH and sPUCCH.

A UE may receive the PDSCH from a base station in nth subframe according to the 14 symbol TTI. In this case, the UE may be configured to transmit the PUCCH for transmitting feedback information (e.g., ACK/NACK information) for the corresponding PDSCH in (n+4) th subframe according to the 14 symbol TTI. That is, the UE can identify a resource region (e.g., a subframe) allocated for the PUCCH based on a reception time point of the PDSCH.

However, before the UE receives the PDSCH and transmits the PUCCH for the PDSCH, the UE may additionally receive the sPDSCH from the base station in the nth subframe according to the 2 symbol sTTI. In this case also, the UE may be configured to transmit the sPUCCH for transmitting feedback information for the sPDSCH in (n+4) th subframe according to the 2 symbol sTTI. In other words, the UE can identify a resource region (e.g., a subframe) allocated for the sPUCCH based on a reception timing of the sPDSCH.

At this time, since the transmission units of the sPDSCH and the sPUCCH are configured to be smaller than the transmission units of the PDSCH and the PDCCH, as shown in FIG. 10, the transmission time of the PUCCH and the transmission time of the sPUCCH may be overlapped.

FIG. 10 shows a case where overlap occurs in transmission between the PUCCHs configured to have different TTIs, but it goes without saying that such overlap may occur even in transmission between the PUCCHs configured to have different lengths (i.e., the number of symbols). For example, the PUCCH of FIG. 10 may be a long PUCCH of an NR system and the sPUCCH of FIG. 10 may be a short PUCCH of the NR system.

When the overlap occurs as described above, if the UE has a constraint condition that must satisfy a single carrier property, or if the UE is constrained in terms of power, the corresponding UE can not transmit the PUCCH and the sPUCCH at the same time (i.e., simultaneously) through different bands (i.e., frequency bands). Therefore, a method for solving such overlap needs to be considered.

Specifically, in order to solve the above-mentioned problem, the present specification proposes a method of bundling and transmitting information transmitted through the PUCCH and information transmitted through the sPUCCH. In addition, the present specification proposes a method of matching (or mapping) any one of the information transmitted through the PUCCH and the information transmitted through the sPUCCH to a specific modulation symbol, and a method of matching the other one to a specific uplink resource to which the specific modulation symbol is to be transmitted. Herein, the information transmitted through the PUCCH may mean uplink control information transmitted from the PUCCH, and the information transmitted through the sPUCCH may mean uplink control information transmitted from the sPUCCH.

In general, the number of bits that may be transmitted through the PUCCH or the sPUCCH may be determined according to the number of streams to be transmitted. For example, when the base station transmits data to the UE through two streams using a plurality of antennas, the UE can transmit 2-bit ACK/NACK information indicating a decoding result (i.e., whether or not ACK/NACK) for each stream through the PUCCH or the sPUCCH.

Hereinafter, when the PUCCH and the sPUCCH are overlapped as described above, a specific method for transmitting uplink control information by the UE, which depends on composition of the number of bits of the information transmitted through the PUCCH and the number of bits of the information transmitted through the sPUCCH, will be described.

First, in one embodiment of the present invention, when the information transmitted through the PUCCH and the information transmitted through the sPUCCH are all composed of (or configured as) one bit, a method for transmitting uplink control information by the UE will be described.

The UE may bundle 1 bit transmitted through the PUCCH and 1 bit transmitted through the sPUCCH to convert (or generate, compose) them into 1 bit, and perform Binary Phase Shift Keying (BPSK) modulation for 1 bit. Accordingly, the UE can transmit the converted 1 bit (i.e., bundled information) using modulation symbols (e.g., 1, −1) generated through the BPSK modulation. However, when the UE transmits the converted 1 bit through the PUCCH, the bit is changed in the middle, which may affect decoding of the network. Therefore, it may be desirable for the UE to transmit the converted 1 bit through the sPUCCH rather than the PUCCH.

Alternatively, the UE may convert (or generate, compose) 1 bit transmitted through the PUCCH and 1 bit transmitted through the sPUCCH into a total of 2 bits, and perform a Quadrature Phase Shift Keying (QPSK) modulation (for example, a modulation scheme such as a (legacy LTE system) PUCCH format 1b) for 2 bits. When the UE maps each 1 bit to 2 bits, 1 bit corresponding to the sPUCCH may be mapped earlier than 1 bit corresponding to the PUCCH, or may be mapped later. For example, when a bit value for a decoding result to be transmitted through the PUCCH is '1' and a bit value for a decoding result to be transmitted through the sPUCCH is '0', the UE can transmit 2 bits configured to '01' or '10'.

Alternatively, the UE may transmit 1 bit corresponding to the PUCCH and 1 bit corresponding to the sPUCCH using a modulation scheme (for example, a modulation scheme such as a (legacy LTE system) PUCCH format 1 a) for 1 bit and a channel selection scheme, together. In this case, the UE can transmit information composed of 2 bits by using a scheme of modulating (or mapping) 1 bit to a modulation symbol according to the BPSK modulation, and transmitting it through one of two different resource regions configured for the remaining 1 bit.

For example, in order to transmit 2 bits, the UE may map 1 bit transmitted through the PUCCH through the BPSK modulation, and configure two different resource regions for 1 bit transmitted through the sPUCCH to transmit the modulation symbols through one of them. In other words, the UE may perform the BPSK modulation for 1 bit transmitted through the PUCCH to generate modulation symbols (for example, 1 or −1), and transmit the modulation symbols through one of two preset (or reserved) uplink resources to indicate 1 bit transmitted through the sPUCCH. That is, the UE can transmit uplink control information by a scheme of transmitting a specific modulation symbol (i.e., a modulation symbol corresponding to 1 bit transmitted through the PUCCH) using a specific uplink resource (i.e., an uplink resource indicating 1 bit transmitted through the sPUCCH).

Through this, the UE can transmit both the uplink control information to be transmitted by the PUCCH and the uplink control information to be transmitted by the sPUCCH to the base station. A detailed example of this is shown in FIG. 11.

FIG. 11 shows an example of a method for transmitting uplink control information which a method proposed by the present disclosure may be applied. FIG. 11 is merely for convenience of explanation, and does not limit the scope of the present invention.

Referring to FIG. 11, it is assumed that information on PUCCH (i.e., uplink control information transmitted through the PUCCH) and information on sPUCCH (i.e., uplink control information transmitted through the sPUCCH) are all configured as 1 bit.

At this time, the information on the PUCCH is converted (or mapped) to modulation symbols (e.g., 1, −1) through a modulation scheme (e.g., BPSK modulation). In addition, uplink resource regions for indicating (or mapping) the information on the sPUCCH may be configured. For example, when the information on the sPUCCH is 1 bit, the uplink resource regions may be configured as a region 1102 and a region 1104. Here, the region 1102 may be mapped to '0' (that is, it indicates '0'), and the region 1104 may be mapped to '1'.

As shown in FIG. 11, when the information on the PUCCH is '1' and the information on the sPUCCH is '1', a UE may transmit a modulation symbol corresponding to '1' mapped to the region 1104 indicating '1' to a base station. In other words, the UE may transmit the modulation symbol corresponding to '1' to the base station using the region 1104 indicating '1'.

In this manner, even if transmission of the PUCCH and transmission of the sPUCCH are overlapped at the same time, the UE can transmit both the information on the PUCCH and the information on the sPUCCH to the base station.

At this time, according to a priority of an uplink channel, an uplink channel of which the information is mapped (or configured) to a modulation symbol and an uplink channel (i.e., an uplink channel mapped to the uplink resource region) to be indicated by the uplink resource region may be determined. In the above example, it is assumed that a priority of the sPUCCH is configured to be higher than a priority of the PUCCH. In view of a fact that a transmission unit of the sPUCCH is configured to be shorter than a transmission unit of the PUCCH, it may be preferable that the priority is configured as shown in the above example in order to place a successful decoding probability of the sPUCCH in priority over the case of the PUCCH. However, unlike the above example, when the priority of the PUCCH is configured to be higher than that of the sPUCCH, a method in which the information transmitted through the sPUCCH is indicated by the modulation symbol and the information transmitted through the PUCCH is indicated by the uplink resource region may be used.

In addition, in another embodiment of the present invention, when the information transmitted through the PUCCH and the information transmitted through the sPUCCH are both composed of 2 bits, a method for transmitting uplink control information by the UE will be described.

The UE may bundle 2 bits transmitted through the PUCCH and 2 bits transmitted through the sPUCCH to convert (or generate, compose) them into 2 bits, and perform a QPSK modulation (for example, a modulation scheme such as a (legacy LTE system) PUCCH format 1b) on 2 bits. Accordingly, the UE can transmit the converted 2 bits (i.e., bundled information) using modulation symbols (e.g., 1, −1, j, and −j) generated through the QPSK modulation.

Alternatively, without the bundling as described above, the UE may compose the 2 bits transmitted through the PUCCH and the 2 bits transmitted through the sPUCCH into a total of 4 bits, and transmit 2 bits corresponding to the PUCCH and 2 bits corresponding to the sPUCCH using a modulation scheme (for example, a modulation scheme such as a (legacy LTE system) PUCCH format 1b) for 2 bits and a channel selection scheme, together. In this case, the UE can transmit information composed of 4 bits by using a scheme of modulating (or mapping) 2 bits to a modulation symbol according to QPSK modulation, and transmitting the modulation symbol through one of four different resource regions configured for the remaining 2 bits.

For example, in order to transmit 4 bits, the UE may map 2 bits transmitted through the PUCCH through QPSK modulation, and configure four different resource regions for 2 bits transmitted through the sPUCCH to transmit the modulation symbols through one of them. In other words, the UE may perform QPSK modulation for 2 bits transmitted through the PUCCH to generate modulation symbols (for example, 1, −1, j, or −j), and transmit the modulation symbols through one of four preset (or reserved) uplink resources to indicate 2 bits transmitted through the sPUCCH. That is, the UE can transmit uplink control information by a scheme of transmitting a specific modulation symbol (i.e., a modulation symbol corresponding to 2 bits transmitted through the PUCCH) using a specific uplink resource (i.e., an uplink resource indicating 2 bits transmitted through the sPUCCH).

Through this, the UE can transmit both the uplink control information to be transmitted by the PUCCH and the uplink control information to be transmitted by the sPUCCH to the base station. A detailed example of this is shown in FIG. 12.

FIG. 12 shows another example of a method for transmitting uplink control information to which a method proposed by the present disclosure may be applied. FIG. 12 is merely for convenience of explanation, and does not limit the scope of the present invention.

Referring to FIG. 12, it is assumed that information on PUCCH (i.e., uplink control information transmitted through the PUCCH) and information on sPUCCH (i.e., uplink control information transmitted through the sPUCCH) are all configured as 2 bits.

At this time, the information on the PUCCH is converted (or mapped) to modulation symbols (e.g., 1, −1, j, −j) through a modulation scheme (e.g., QPSK modulation). In addition, uplink resource regions for indicating (or mapping) the information on the sPUCCH may be configured. For example, when the information on the sPUCCH is 2 bits, the uplink resource regions may be configured as a region 1202, a region 1204, a region 1206, and a region 1208. Here, the region 1202 may be mapped to '00' (that is, it indicates '00'), the region 1204 may be mapped to '01', the region 1206 may be mapped to '11', and the region 1208 may be mapped to '10'.

As shown in FIG. 12, when the information on the PUCCH is '11' and the information on the sPUCCH is '01', a UE may transmit a modulation symbol corresponding to '11' mapped to the region 1204 indicating '01' to a base station. In other words, the UE may transmit the modulation symbol corresponding to '11' to the base station using the region 1204 indicating '01'.

In this manner, even if transmission of the PUCCH and transmission of the sPUCCH are overlapped at the same time, the UE can transmit both the information on the PUCCH and the information on the sPUCCH to the base station.

In this case also, according to a priority of an uplink channel, an uplink channel of which the information is mapped (or configured) to a modulation symbol and an uplink channel to be indicated by the uplink resource region may be determined. Generally, since information transmitted through the sPUCCH is sensitive to latency, it is necessary to increase decoding probability for this. Therefore, as in the above example, it may be preferable that the priority of the sPUCCH is configured to be higher than the priority of the PUCCH. As the information on the sPUCCH is configured to be distinguished (or identified, indicated) based on a resource location, there is an effect that the probability of decoding success for the sPUCCH can be higher than that of decoding through modulation.

However, it is needless to say that, unlike the above example, the priority of the PUCCH may be configured to be higher than that of the sPUCCH. In this case, in order to transmit a total of 4 bits of information, the UE may map 2 bits transmitted through the sPUCCH through QPSK modulation, and configure four different resource regions for 2 bits transmitted through the PUCCH to transmit the modulation symbols through one of them.

Alternatively, a method may be considered in which first bits of each 2 bits transmitted through the PUCCH and the sPUCCH are composed of 2 bits, and the remaining bits (that is, second bits of each 2 bits) are composed of different 2 bits. In this case, in order to transmit a total of 4 bits of information, the UE may map 2 bits composed of the first bits through QPSK modulation, and configure four different resource regions for 2 bits composed of the remaining bits to transmit the modulation symbols through one of them. Alternatively, on the contrary to this, the UE may map 2 bits composed of the second bits through QPSK modulation, and transmit the modulation symbols through one of four different resource regions configured for 2 bits composed of the first bits.

Furthermore, in another embodiment of the present invention, when the number of bits of information transmitted through the PUCCH and the number of bits of information transmitted through the sPUCCH are composed differently, a method for transmitting uplink control information by the UE will be described.

For example, when the information transmitted through the PUCCH is composed of 1 bit and the information transmitted through the sPUCCH is composed of 2 bits, the case where the information transmitted through the PUCCH is composed of 2 bits, and the information transmitted through the sPUCCH is composed of 1 bit may be considered.

In this case, the UE repeats the decoding result corresponding to 1 bit to compose 2 bits, and then the UE can transmit the uplink control information by applying equally a method of the case where the information transmitted through the above-described PUCCH and the information transmitted through the sPUCCH are both composed of 2 bits.

Alternatively, in order to transmit uplink control information, the UE may map 1 bit through BPSK modulation, and configure four different resource regions for the remaining 2 bits to transmit the modulation symbols through one of them. A detailed example of this is shown in FIG. 13.

FIG. 13 shows other example of a method for transmitting uplink control information to which a method proposed by the present disclosure may be applied. FIG. 13 is merely for convenience of explanation, and does not limit the scope of the present invention.

Referring to FIG. 13, it is assumed that information on PUCCH (i.e., uplink control information transmitted through the PUCCH) is configured as 1 bit, and information on sPUCCH (i.e., uplink control information transmitted through the sPUCCH) is configured as 2 bits.

At this time, the information on the PUCCH is converted (or mapped) to modulation symbols (e.g., 1, −1) through a modulation scheme (e.g., BPSK modulation). In addition, uplink resource regions for indicating (or mapping) the information on the sPUCCH may be configured. For example, when the information on the sPUCCH is 2 bits, the uplink resource regions may be configured as a region 1302, a region 1304, a region 1306, and a region 1308. Here, the region 1302 may be mapped to '00' (that is, it indicates '00'), the region 1304 may be mapped to '01', the region 1306 may be mapped to '11', and the region 1308 may be mapped to '10'.

As shown in FIG. 13, when the information on the PUCCH is '1' and the information on the sPUCCH is '11', a UE may transmit a modulation symbol corresponding to '1' mapped to the region 1306 indicating '11' to a base station. In other words, in order to transmit uplink control information, the UE may transmit the modulation symbol corresponding to '1' to the base station using the region 1306 indicating '11'.

In this manner, even if transmission of the PUCCH and transmission of the sPUCCH are overlapped at the same time, the UE can transmit both the information on the PUCCH and the information on the sPUCCH to the base station.

Alternatively, unlike that shown in FIG. 13, in order to transmit uplink control information, the UE may map 2 bits through QPSK modulation, and configure two different resource regions for the remaining 1 bit to transmit the modulation symbols through one of them.

In the various embodiments of the present invention described above, methods in which all the sizes of information transmitted in two different channels are 2 bits or less have been described. However, there may be a case where the size of information transmittable in each channel exceeds 2 bits. Accordingly, in another embodiment of the present invention, when the size of information transmitted in one or all of overlapped channels exceeds 2 bits, a method for transmitting uplink control information by the UE will be described.

For example, in case of multiple HARQ ACK/NACK information or CSI considering a Carrier Aggregation (CA) environment, a size of a payload is configured to be large. In this case, the UE can transmit the uplink control information using a format (e.g., PUCCH format 4 (of legacy LTE system)) used for transmission of large capacity control information. Such a format may be determined according to the size of information (i.e., payload) to be transmitted on the PUCCH and/or the sPUCCH.

When the size of the payload of one of the two overlapped channels is 2 bits and the size of the payload of the other channel exceeds 2 bits, a method may be considered in which a modulation scheme is applied to a channel corresponding to 2 bits or less, and a channel selection scheme is applied to a channel corresponding to more than 2 bits. That is, in order to transmit the uplink control information, the UE may map 2 bits or less of information through BPSK modulation or QPSK modulation, and configure different resource regions of the number corresponding to the number of bits for information of more than 2 bits to transmit the modulation symbols through one of them.

Alternatively, when the size of the payload to be transmitted on both channels exceeds a specific number of bits (e.g., a predetermined number of critical bits), the UE may together transmit information to be transmitted on both channels using a format (e.g., PUCCH format 4) used for transmission of large capacity control information. Alternatively, in this case, a format (i.e., transmission structure) to be used for transmission of the UE may be configured considering a type of uplink control information to be transmitted through each channel.

According to the above-described criteria, when the UE together composes payloads of the PUCCH and sPUCCH to be overlapped, and transmits the uplink control information through the format (e.g., PUCCH format 4) used for transmission of large capacity control information, channel coding of an entire unit of the payload may be applied. Even when the information of each channel is mixed to compose a payload, the channel coding may be applied in a single manner.

However, depending on a type of an applied channel coding scheme, when information of each channel (i.e., payload) is composed together, it may be necessary to distinguish a location where each information is placed. For example, when Reed-Muller coding scheme is used as a channel coding scheme, the UE can apply (or perform) channel coding by arranging information having a high priority in the front. As an example of a criterion for configuring priorities, in terms of latency, information to be transmitted through the sPUCCH may have a higher priority than information to be transmitted through the PUCCH. Alternatively, as another example, depending on a type of uplink control information, HARQ ACK/NACK information may have a higher priority than CSI.

When the UE composes and transmits together the information to be transmitted through each channel as described above, the UE may transmit the uplink control information by puncturing or cyclic repetition of a coded bit to match a size of a container to be transmitted. Here, the size of the container may mean a size of a resource (e.g., a time resource or a frequency resource) to transmit control information or data.

Hereinafter, in various embodiments of the present invention described above, examples of a method of configuring a plurality of different resource regions (i.e., a plurality of predetermined different uplink resource regions) (e.g., the regions shown in FIGS. 11 to 13) for specific information will be described. Hereinafter, for convenience of explanation, the plurality of different resource regions for the specific information are referred to as a plurality of reserved resource regions.

First, as an example of an explicit configuration method, the base station may configure the plurality of reserved resource regions for the UE through higher layer signaling (e.g., RRC signaling, MAC-CE, etc.) and/or physical layer signaling (e.g., DCI). That is, the base station may transmit configuration information (e.g., uplink resource configuration information) indicating the plurality of reserved resource regions to the UE through the higher layer signaling and/or the physical layer signaling.

At this time, the base station may inform (or transmit) the configuration information indicating the plurality of reserved resource regions through a PDCCH or inform it through an sPDCCH. For example, the base station may transmit the configuration information to the UE through the PDCCH configured to a short TTI or the PDCCH configured to a long TTI. Specifically, the base station may explicitly designate a specific resource (e.g., default uplink support), and configure the plurality of reserved resource regions by a method of putting an offset (e.g., an offset indicated in HARQ-ACK resource offset field of a DCI format) before and/or after the corresponding resource. Here, the offset may mean time and/or frequency unit offset between uplink resources. Alternatively, the base station may explicitly configure (or indicate) the plurality of reserved resource regions.

Next, as an example of an implicit configuration method, a method of configuring the plurality of reserved resource regions may be considered using a control channel element (CCE) index of an (s)PDCCH allocating an (s)PDSCH corresponding to the HARQ ACK/NACK information to transmit the HARQ ACK/NACK information. That is, in order to configure the plurality of reserved resource regions, the CCE index of the (s)PDCCH that transmits scheduling information (i.e., control information) for the (s)PDSCH that is a target of feedback information to be transmitted by the UE through the (s)PUCCH may be used.

Here, the CCE index may include a CCE index for the sPDCCH (i.e., a CCE index of the sPDCCH) and/or a CCE index for the PDCCH (i.e., a CCE index of the PDCCH). In other words, in this case, the plurality of reserved resource regions may be configured according to a CCE index of one of two channels, or may be configured according to a combination of CCE indexes of the two channels. Even in this case, the base station may implicitly designate a specific resource (e.g., default uplink support), and configure the plurality of reserved resource regions by a method of putting an offset (e.g., an offset indicated in HARQ-ACK resource offset field of a DCI format) before and/or after the corresponding resource.

Specifically, in order to configure the plurality of reserved resource regions, a method for determining whether to use which one among the CCE index for the sPDCCH, the CCE index for the PDCCH, or the combination of the CCE indexes of the two channels may be considered as follows.

First, a CCE index to be used may be determined according to whether information mapped to the plurality of reserved resource regions (i.e., information indicated by the plurality of reserved resource regions) is information transmitted through the sPUCCH or information transmitted through the PUCCH. For example, in the case of FIG. 13, since the information on the sPUCCH is mapped to the plurality of reserved resource regions, the plurality of reserved resource regions may be configured according to the CCE index of the sPDCCH.

Alternatively, conversely, when the information mapped to the plurality of reserved resource regions is the information on the sPUCCH, the plurality of reserved resource regions may be configured according to the CCE index of the PDCCH.

Alternatively, when the information mapped to the plurality of reserved resource regions is information that is mixed information of the information on the sPUCCH and the information on the PUCCH, the plurality of reserved resource regions may be configured according to a bit order of the mixed information. For example, when 2 bits are mapped to four resource regions, a first bit of the 2 bits may be configured to the information on the sPUCCH, and a second bit of it may be configured to the information on the PUCCH. At this time, the plurality of reserved resource regions may be configured according to a TTI corresponding to the first bit, that is, the CCE index of the sPDCCH. Alternatively, conversely, the plurality of reserved resource regions may be configured according to a TTI corresponding to the second bit, that is, the CCE index of the PDCCH.

Alternatively, regardless of the information mapped to the plurality of reserved resource regions, fixed in the system, the plurality of reserved resource regions may be configured in advance to follow any one among the CCE index of the sPDCCH, the CCE index of the PDCCH, or the combination of the CCE indexes of the two channels.

In various embodiments of the present invention described above, the UE may transmit a configured structure as described above (that is, a structure for transmitting a specific modulation symbol in a specific uplink resource) in accordance with a container according to the PUCCH or a container according to the sPUCCH. Here, the container according to the PUCCH may include a container composed of 1 ms or a container composed according to the number of symbols allocated to the PUCCH, etc. Alternatively, the container according to the sPUCCH may include a container composed to be smaller than 1 ms, or a container composed according to the number of symbols allocated to the sPUCCH, etc.

For example, when the transmission of the PUCCH is configured to have a higher priority than the transmission of the sPUCCH considering the latency, the UE may transmit the configured structure as described above in accordance with the container according to the sPUCCH (i.e., by configuring a small number of symbols, a short length, or a short transmission unit). As another example, when the transmission of the PUCCH is configured to have a higher priority than the transmission of the sPUCCH considering coverage of the UE and the like by priority, the UE may transmit the configured structure as described above in accordance with the container according to the PUCCH (i.e., by configuring a large number of symbols, a long length, or a long transmission unit).

In this case, the base station may transmit (or inform) the configuration information, that is, the configuration information related to the container to be transmitted, as described above to the UE through the higher layer signaling and/or the physical layer signaling.

FIG. 14 is a flowchart illustrating an operation of a UE for transmitting uplink control information to which a method proposed by the present disclosure may be applied. FIG. 14 is merely for convenience of explanation and does not limit the scope of the present invention.

Referring to FIG. 14, it is assumed that a UE transmits uplink control information to a base station using the above-described methods.

In step S1405, the UE identifies a resource region allocated to a first uplink control channel and a resource region allocated to a second uplink control channel. Here, the first uplink control channel is used to transmit first uplink control information, and the second uplink control channel is used to transmit second uplink control information.

Thereafter, in step S1410, when transmission (or transmission time) of the first uplink control channel overlaps transmission (or transmission time) of the second uplink control channel, the UE transmits a specific modulation symbol to the base station using a specific uplink resource. For example, the specific uplink resource may mean one of the plurality of reserved resource regions described above (i.e., one of the regions shown in FIGS. 11-13).

At this time, the specific uplink resource and the specific modulation symbol may be configured based on a priority between the first uplink control channel and the second uplink control channel. In addition, the specific uplink resource may indicate the first uplink control information, and the specific modulation symbol may correspond to the second uplink control information.

In addition, the first uplink control channel may have a higher priority than the second uplink control channel. In other words, a priority of a channel indicated by the specific uplink resource may be higher than a priority of a channel corresponding to the specific modulation symbol. When a modulation scheme is used, decoding performance at a receiving end (e.g., the base station) may be degraded due to interference or the like. On the other hand, in a method of mapping information to uplink resources, decoding performance can be improved by orthogonality between different uplink resources. Accordingly, it may be desirable that information transmitted through the channel having the higher priority is mapped to the uplink resource (i.e., information transmitted through the channel having the higher priority is indicated by the uplink resource).

In addition, the number of symbols allocated to the first uplink control channel may be configured to be less than the number of symbols allocated to the second uplink control channel. For example, the first uplink control channel may mean a PUCCH configured with a short TTI or a short PUCCH, and the second uplink control channel may mean a PUCCH configured with a long TTI or a long PUCCH.

In addition, the first uplink control information may include at least one of ACK/NACK information and SR, and the second uplink control information may include CSI.

In addition, the first uplink control channel may be configured based on a first TTI, and the second uplink control channel may be configured based on a second TTI, at this time, the first TTI may be shorter than the second TTI. In this case, the transmission of the specific modulation symbol using the specific uplink resource may be performed according to the first TTI (i.e., short TTI) as in the above-described method.

In addition, the UE may receive, from the base station, a first PDSCH and a second PDSCH. In this case, the first uplink control information may include ACK/NACK information for the first PDSCH, and the second uplink control information may include ACK/NACK information for the second PDSCH.

In addition, the specific uplink resource may be one of a plurality of uplink resources (for example, the plurality of reserved resource regions described above) configured in advance for the transmission of the uplink control channel. In this case, the plurality of uplink resources configured in advance may be configured according to a CCE index of at least one of a first PDCCH corresponding to the first PDSCH or a second PDCCH corresponding to the second PDSCH. Here, the PDCCH corresponding to the PDSCH may mean a PDCCH for transmitting scheduling information (i.e., control information) for the corresponding PDSCH.

In addition, the UE may receive uplink resource configuration information indicating the plurality of uplink resources configured in advance. This may be performed through higher layer signaling and/or physical layer signaling. In this case, the specific uplink resource may be one of the plurality of uplink resources configured in advance for the transmission of the uplink control channel.

In addition, the plurality of uplink resources configured in advance may be configured based on an offset between a default uplink resource and uplink resources.

In addition, the specific modulation symbol may correspond to a BPSK modulation symbol or a QPSK modulation symbol.

The method for transmitting the uplink control information using the modulation scheme and channel selection scheme considered in the various embodiments of the present invention described above may compose differently the information corresponding to (or mapped to) the specific modulation symbol and the specific uplink resource considering the priority between channels. In this regard, the corresponding method is different from the method (for example, the channel selection scheme in the PUCCH format 1b of the legacy LTE system) for transmitting the uplink control information by predefining resource regions and bits to transmitted used for transmission according to a combination (or composition) of ACK/NACK information that can be simply considered.

Overview of Devices to which the Present Invention can be Applied

FIG. 15 illustrates a block diagram of a wireless communication device to which methods proposed by the present disclosure may be applied.

Referring to FIG. 15, a wireless communication system includes a base station 1510 and a plurality of UEs 1520 located in the base station 1510 region.

The base station 1510 includes a processor 1511, a memory 1512, and a radio frequency (RF) unit 1513. The processor 1511 implements the functions, processes and/or methods proposed in FIGS. 1 to 14 above. Layers of a wireless interface protocol may be implemented by the processor 1521. The memory 1512, being connected to the processor 1511, stores various types of information for driving the processor 1511. The RF unit 1513, being connected to the processor 1511, transmits and/or receives wireless signals.

The UEs 1520 includes a processor 1521, a memory 1522, and a radio frequency (RF) unit 1523.

The processor 1521 implements the functions, processes and/or methods proposed in FIGS. 1 to 14 above. Layers of a wireless interface protocol may be implemented by the processor 1521. The memory 1522, being connected to the processor 1521, stores various types of information for driving the processor 1521. The RF unit 1523, being connected to the processor 1521, transmits and/or receives wireless signals.

The memory 1512, 1522 can be installed inside or outside the processor 1511, 1521 and connected to the processor 1511, 1521 through various well-known means.

For example, in order to transmit and receive downlink data (DL data) in a wireless communication system supporting a low latency service, the UE may include a radio frequency (RF) unit for transmitting and receiving wireless signals, and a processor functionally connected to the RF unit.

In addition, the base station 1510 and/or the UE 1520 can have a single antenna or multiple antennas.

FIG. 16 illustrates a block diagram of a communication device according to an embodiment of the present invention.

Particularly, FIG. 16 illustrates the UE of FIG. 15 in more detail.

Referring to FIG. 16, the UE includes a processor (or digital signal processor (DSP)) 1610, an RF module (or RF unit) 1635, a power management module 1605, an antenna 1640, a battery 1655, a display 1615, a keypad 1620, a memory 1630, a Subscriber Identification Module (SIM) card 1625 (which may be optional), a speaker 1645 and a microphone 1650. The UE may include a single antenna or multiple antennas.

The processor 1610 may be configured to implement the functions, processes and/or methods proposed in FIGS. 1 to 14 above. Layers of a wireless interface protocol may be implemented by the processor 1610.

The memory 1630 is connected to the processor 1610 and stores information related to operations of the processor 1610. The memory 1630 may be located inside or outside the processor 1610 and may be connected to the processors 1610 through various well-known means.

A user enters command information, such as a telephone number, for example, by pushing (or touching) the buttons of a keypad 1620 or by voice activation using the microphone 1650. The processor 1610 receives the command information and processes to perform the appropriate function, such as to dial the telephone number. Operational data may be extracted from the SIM card 1625 or the memory 1630. Furthermore, the processor 1610 may display the command and operational information on the display 1615 for the user's recognition and convenience.

The RF module 1635 is connected to the processor 1610, transmits and/or receives an RF signal. The processor 1610 forwards the command information to the RF module 1635, to initiate communication, for example, to transmit wireless signals comprising voice communication data. The RF module 1635 is comprised of a receiver and a transmitter for receiving and transmitting wireless signals. The antenna 1640 functions to transmit and receive wireless signals. Upon receiving the wireless signals, the RF module 1635 can forward the signal for processing by the processor 1610 and convert the signal to baseband. The processed signals may be converted into audible or readable information output via the speaker 1645.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method for transmitting an uplink channel in a wireless communication system of the present invention has been illustrated as being applied to the 3GPP LTE/LTE-A system, a 5G system (New RAT system), but may be applied to various wireless communication systems in addition to them.

The invention claimed is:

1. A method of transmitting uplink control information by a user equipment (UE) in a wireless communication system, the method comprising:
    identifying a resource region allocated to a first uplink control channel for transmitting first uplink control information and a resource region allocated to a second uplink control channel for transmitting second uplink control information; and
    transmitting, to a base station, a specific modulation symbol using a specific uplink resource, based on a transmission of the first uplink control channel overlapping a transmission of the second uplink control channel,
    wherein the specific uplink resource and the specific modulation symbol are configured based on a relative priority between the first uplink control channel and the second uplink control channel,
    wherein a location of the specific uplink resource indicates the first uplink control information, and
    wherein the specific modulation symbol corresponds to the second uplink control information.

2. The method of claim 1, wherein the first uplink control channel has a higher priority than the second uplink control channel.

3. The method of claim 2, wherein the first uplink control channel is configured based on a first transmission time interval,
    wherein the second uplink control channel is configured based on a second transmission time interval, and
    wherein the first transmission time interval is shorter than the second transmission time interval.

4. The method of claim 3, wherein the transmission of the specific modulation symbol using the specific uplink resource is performed based on the first time transmission interval.

5. The method of claim 1, wherein a number of symbols allocated to the first uplink control channel is configured to be less than a number of symbols allocated to the second uplink control channel.

6. The method of claim 5, wherein the first uplink control information includes at least one of Acknowledgement (ACK) information/Not-Acknowledgement (NACK) information and a scheduling request, and
    wherein the second uplink control information includes channel state information.

7. The method of claim 5, wherein the first uplink control channel is a short physical uplink control channel (SPUCCH), and
    wherein the second uplink control channel is a physical uplink control channel (PUCCH).

8. The method of claim 1, further comprising:
    receiving, from the base station, a first downlink shared channel, and receiving, from the base station, a second downlink shared channel,
    wherein the first uplink control information includes Acknowledgement (ACK)/Not-Acknowledgement (NACK) information on the first downlink shared channel, and
    wherein the second uplink control information includes ACK/NACK information on the second downlink shared channel.

9. The method of claim 8, wherein the specific uplink resource is one of a plurality of uplink resources predetermined for uplink control channel transmission, and
    wherein the predetermined plurality of uplink resources are configured based on at least one control channel element index among a first downlink control channel related to the first downlink shared channel or a second downlink control channel related to the second downlink shared channel.

10. The method of claim 9, wherein the predetermined plurality of uplink resources are configured based on an offset between a default uplink resource and uplink resources.

11. The method of claim 1, further comprising:
    receiving, from the base station, uplink resource configuration information for a plurality of uplink resources predetermined for uplink control channel transmission, and
    wherein the specific uplink resource is one of the predetermined plurality of uplink resources.

12. The method of claim 1, wherein the specific modulation symbol corresponds to a binary phase shift keying (BPSK) modulation symbol or a quadrature phase shift keying (QPSK) modulation symbol.

13. A user equipment (UE) for transmitting uplink control information in a wireless communication system, the UE comprising:
    a transmitter and a receiver for transmitting and receiving a wireless signal, and a processor functionally connected to the RF unit,
    wherein the processor is configured to control to:
        identify a resource region allocated to a first uplink control channel for transmitting first uplink control information and a resource region allocated to a second uplink control channel for transmitting second uplink control information; and
        transmitting, to a base station, a specific modulation symbol using a specific uplink resource, based on a transmission of the first uplink control channel overlapping a transmission of the second uplink control channel, wherein the specific uplink resource and the specific modulation symbol are configured based on a relative priority between the first uplink control channel and the second uplink control channel, wherein a location of the specific uplink resource indicates the first uplink control information, and wherein the specific modulation symbol corresponds to the second uplink control information.

14. The UE of claim 13, wherein the first uplink control channel has a higher priority than the second uplink control channel.

15. The UE of claim 13, wherein a number of symbols allocated to the first uplink control channel is configured to be less than a number of symbols allocated to the second uplink control channel.

* * * * *